US012485700B2

(12) United States Patent
Sheffield et al.

(10) Patent No.: US 12,485,700 B2
(45) Date of Patent: Dec. 2, 2025

(54) CONNECTED DEPLOYABLE ARMS OFF OF CYLINDRICAL SURFACES FOR INCREASED MOBILITY

(71) Applicant: Brigham Young University, Provo, UT (US)

(72) Inventors: Jacob Sheffield, Provo, UT (US); Larry L. Howell, Orem, UT (US); Kendall Hal Seymour, Springville, UT (US)

(73) Assignee: Brigham Young University, Provo, UT (US)

(\*) Notice: Subject to any disclaimer, the term of this patent is extended or adjusted under 35 U.S.C. 154(b) by 1082 days.

(21) Appl. No.: 17/429,551

(22) PCT Filed: Feb. 14, 2020

(86) PCT No.: PCT/US2020/018438
§ 371 (c)(1),
(2) Date: Aug. 9, 2021

(87) PCT Pub. No.: WO2020/180476
PCT Pub. Date: Sep. 10, 2020

(65) Prior Publication Data
US 2022/0126627 A1 Apr. 28, 2022

Related U.S. Application Data

(60) Provisional application No. 62/806,322, filed on Feb. 15, 2019.

(51) Int. Cl.
*B60B 19/02* (2006.01)
*B60B 15/12* (2006.01)
(Continued)

(52) U.S. Cl.
CPC .............. *B60B 19/02* (2013.01); *B60B 15/12* (2013.01); *B60B 19/04* (2013.01); *B64U 20/50* (2023.01);
(Continued)

(58) Field of Classification Search
CPC .......... B29J 9/06; B64C 39/024; E21B 10/32; E21B 10/327; B60B 19/02; B60B 19/04;
(Continued)

(56) References Cited

U.S. PATENT DOCUMENTS 1,652,133 A \* 12/1927 Paterson ................. B60B 15/06
301/47
3,196,970 A \* 7/1965 Brenner ................. A61G 5/065
305/1
(Continued)

FOREIGN PATENT DOCUMENTS

CN 104249599 B \* 7/2018
WO WO-2019/241786 A1 12/2019
WO WO-2020/180476 A2 9/2020

OTHER PUBLICATIONS

"Clutch, How Does It Work?" (Learning Engineering) Dec. 31, 2017 (Dec. 31, 2017) [onfine] retrieved from < URL: https://www.youtube.com/watch?v=devo3kdSPQY&feature=emb_title.
(Continued)

*Primary Examiner* — S. Joseph Morano
*Assistant Examiner* — Eva L Comino
(74) *Attorney, Agent, or Firm* — Ballard Spahr LLP

(57) ABSTRACT

A method and apparatus for connected deployable arms off of cylindrical surfaces including an outer cylinder defining an outer circumference and an inner cylinder concentric with the outer cylinder around a central aperture, one or more primary developable mechanisms linked to one or more secondary developable mechanisms. The deployable arms
(Continued)

transition from a first closed state wherein the primary developable mechanisms and secondary developable mechanisms are contained entirely within the outer cylinder outer circumference to a second open state wherein the inner cylinder rotates relative to the outer cylinder, forcing the primary developable mechanisms and secondary developable mechanisms to extend outside the outer cylinder outer circumference.

26 Claims, 13 Drawing Sheets

(51) Int. Cl.
    *B60B 19/04*     (2006.01)
    *B64U 20/50*     (2023.01)
    *B64U 30/293*     (2023.01)
    *E21B 10/32*     (2006.01)
    *B64U 10/13*     (2023.01)

(52) U.S. Cl.
    CPC .......... *B64U 30/293* (2023.01); *E21B 10/327* (2013.01); *B60B 2900/551* (2013.01); *B64U 10/13* (2023.01)

(58) Field of Classification Search
    CPC ... B60B 15/12; B60B 2900/551; B64U 10/13; B64U 30/20; B64U 50/19; B64U 20/50; B64U 30/293
    USPC ........................................................ 305/15
    See application file for complete search history.

(56) References Cited

U.S. PATENT DOCUMENTS

| | | | | |
|---|---|---|---|---|
| 3,692,427 | A | | 9/1972 | Risse |
| 3,798,835 | A | * | 3/1974 | McKeehan .......... A63H 33/005 446/442 |
| 3,995,909 | A | * | 12/1976 | van der Lely .......... B60B 15/26 301/47 |
| 4,547,173 | A | | 10/1985 | Jaworski et al. |
| 4,648,853 | A | * | 3/1987 | Siegfried .............. A63H 17/262 446/457 |
| 4,977,408 | A | | 12/1990 | Harper et al. |
| 7,017,687 | B1 | * | 3/2006 | Jacobsen .............. B62D 57/028 280/5.2 |
| 8,007,341 | B2 | * | 8/2011 | Su ........................ A63H 17/262 446/431 |
| 2004/0206547 | A1 | | 10/2004 | de Luca |
| 2005/0097832 | A1 | | 5/2005 | Hoberman et al. |
| 2010/0173563 | A1 | | 7/2010 | Su |
| 2013/0084180 | A1 | | 4/2013 | Conley et al. |
| 2014/0114138 | A1 | | 4/2014 | Fedorov et al. |
| 2017/0281147 | A1 | | 10/2017 | Koehler et al. |
| 2021/0252693 | A1 | * | 8/2021 | Howell .................... B25J 9/106 |

OTHER PUBLICATIONS

"Deployable Mechanism: Cubic Face" (Laboratoire De Robotique De L'universite Laval) Jun. 4, 2015 (Jun. 4, 2015) [online] retrieved from< URL: https://www.youtube.com/watch?v=jkSk6KwvtaQ.

Nelson, et al., "Developable Mechanisms On Developable Surfaces," Feb. 13, 2019 (Feb. 13, 2019) [online] retrieved from< URL: https://scholarsarchive.byu.edu/cgi/viewcontent.cgi?article=3977 &context=facpub >, entire document.

"New Devices Morph And Transform—Like Iron Man's Suit," (Brigham Young University) Feb. 13, 2019 (Feb. 13, 2019) [online] retrieved from< URL: https://www.youtube.com/watch?v= CdPLzA4xlFO.

International Search Report from International Application No. PCT/US2020/018438, Date Mailed: Aug. 25, 2020.

* cited by examiner

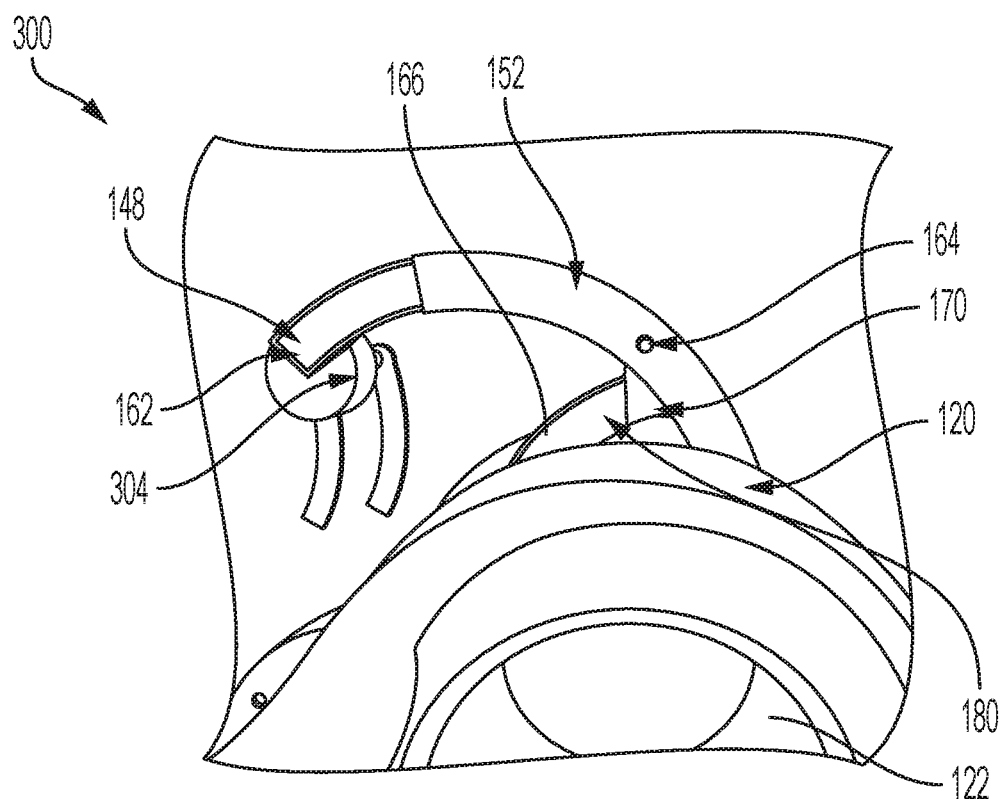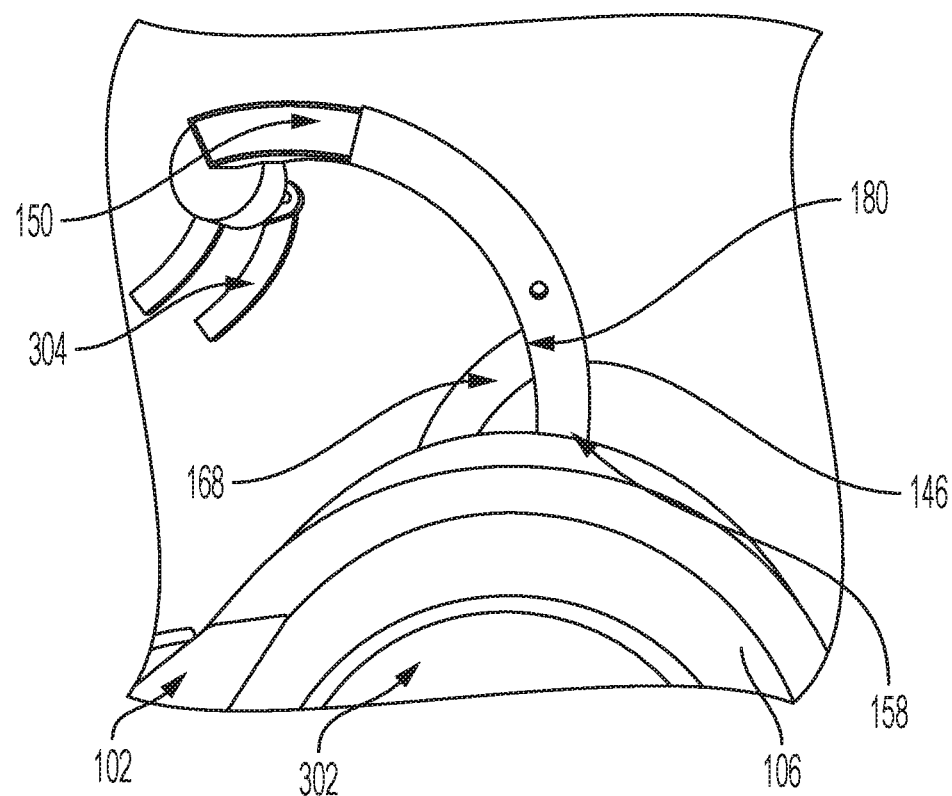
FIG. 9

CONNECTED DEPLOYABLE ARMS OFF OF CYLINDRICAL SURFACES FOR INCREASED MOBILITY

RELATED APPLICATIONS

This application is a national stage filing under 35 U.S.C. 371 of International Application No. PCT/US2020/018438, filed Feb. 14, 2020, which claims priority to, and the benefit of, U.S. Provisional Application No. 62/806,322, filed Feb. 15, 2019. The entire teachings of the above applications are incorporated herein by reference. International Application No. PCT/US2020/018438 was published under PCT Article 21(2) in English.

STATEMENT REGARDING FEDERALLY SPONSORED RESEARCH OR DEVELOPMENT

This invention was made with government support under Grant Number 1663345 awarded by the National Science Foundation. The government has certain rights in the invention.

FIELD OF THE INVENTION

The present invention relates to a method and apparatus for connected deployable arms that transition from a first closed state wherein the primary developable mechanisms and secondary developable mechanisms are contained entirely within the outer cylinder outer circumference to a second open state wherein the inner cylinder rotates relative to the outer cylinder, forcing the primary developable mechanisms and secondary developable mechanisms to extend outside the outer cylinder outer circumference, suitable for allowing a perfectly cylindrical rolling wheel to be deployed into multiple arms along the perimeter to allow for stair climbing or obstacle maneuvering capabilities or for deployable arms on a quadcopter drone to conceal and protect the propellers and arms, decrease storage size, alter frame size diameter during flight, increase portability, or for other deployable embodiments including expanding gears and expanding boring tools. In particular, the present invention relates to multiple connected deployable arm-like mechanisms which when closed are concealed in a cylindrical wall. This motion can have a huge variety of functions.

BACKGROUND

Generally, current technology for improving mobility for traversing common obstacles often have permanent deployable arms that can e.g. climb stairs. However, this technology and methodology experiences some shortcomings, as these devices lack the ability to conform back to a uniform wheel to allow continuous rolling or operating.

Developable mechanisms are mechanisms that can conform to or emerge from developable surfaces, such as cylinders, cones, and tangent developed surfaces. Deploying arms make vehicles more cumbersome to operate when not needed. Transitioning from the undeployed to deployed state often involves stopping progress and attaching or detaching the necessary equipment, further impeding progress and efficient operation. Current technologies lack but need: i) the ability to shape-shift between a cylindrical wheel and an obstacle climbing mechanism; ii) a single rotation which controls and actuates out all of the extending arms simultaneously that significantly reduces the parts required and ease of control where multiples of the extending arms has no impact or increased complexity in the actuation method; and iii) Simple adjustable extended diameters depending on the size of the obstacle (rover/vehicle), step (wheel), gap (drone), gear size (gear), or amount that the arms are deployed so as to be fully adjustable to adapt to the surroundings and needs.

SUMMARY

There is a need for a device composed of deployable arms that conform to a central hub that contains a developable surface in order to increase mobility, range and maneuverability while keeping components compact. The need for such components that possess the ability to adjust is even greater. The present invention is directed toward further solutions to address this need, in addition to having other desirable characteristics. Specifically, a method and apparatus for connected deployable arms off of cylindrical surfaces including an outer cylinder defining an outer circumference and an inner cylinder concentric with the outer cylinder around a central aperture, one or more primary developable mechanisms linked to one or more secondary developable mechanisms. The deployable arms transition from a first closed state wherein the primary developable mechanisms and secondary developable mechanisms are contained entirely within the outer cylinder outer circumference to a second open state wherein the inner cylinder rotates relative to the outer cylinder, forcing the primary developable mechanisms and secondary developable mechanisms to extend outside the outer cylinder outer circumference. The mechanism's links are arranged and shaped such that they can conform to the surface in at least one point in their motion. This motion can both extend outward (extramobile) or move inward (intramboile) relative to the cylinder walls. The behavior, path, deployment rate, actuation limits, etc. depend on changing the distance between joints. Additional deployment limits can also be set by using hard stop restraints from interfering links or developable mechanisms. Some combinations will cause members to cross through the inside of the cylinder rather than only deploying outward from the cylinder. Other combinations have interference with other members unless they reside on different planes. Various applications begin to emerge as these parameters are optimized and the geometry of the components is changed. Regarding wheels, the invention allows a perfectly cylindrical rolling wheel to be deployed into multiple arms along the perimeter to now allow for stair climbing or obstacle maneuvering capabilities. This would be ideal for wheelchairs, interplanetary rovers, and rough terrain vehicles. The wheel could expand up to 300% of its original size. The arms can be deployed or adjusted in variable magnitudes and vectors to conform to different surroundings or circumstances, enabling approach to different sized obstacles including differences in stair or curb heights and lock in place at these varying frame diameters. Similarly, by deploying to a smaller diameter intermediary open state the arm or wheel can continue to roll with little disturbance in motion but supply more traction. This can be particularly useful to simulate chains or similar mechanical improvements for snow or ice. Regarding drones, deployable arms on a quadcopter drone can conceal and protect the propellers and arms, and can enable decreased storage size, increased portability, and adjustable mid-flight arm-span diameter to fit into small openings. Regarding gears, multiples of these linkages of deploying arms can deploy out to engage or disengage with other gears or drive shafts. Regarding boring tools and drills, a drill bit or boring bit can expand in diameter using the deployable arms to avoid the time required to change out boring tools for different applications, conditions or to avoid obstacles. The expanding region of the drill bit or boring tool can also be restricted to reside on a certain region of the bit or tool, such as an end, and can expand during a drilling process to create a larger cavity or hole beneath the face of the object that is larger than the entry diameter.

In accordance with example embodiments of the present invention, a connected deployable arms device for increased mobility comprises a central hub comprising a developable surface and an outer cylinder comprising: a first end having a first annular surface; a second end having a second annular surface; a primary wall extending between the first end and the second end, defining an outer circumference of the outer cylinder, having a cylindrical surface and a central aperture therethrough from the first end to the second end; an inner cylinder comprising: a first end having a first annular surface; a second end having a second annular surface; a secondary wall extending between the first end and second end, defining an outer circumference of the inner cylinder, having a circumferential surface and the central aperture therethrough from the first end to the second end, the inner cylinder being concentric with, and rotatably coupled to, the outer cylinder. The first end of the inner cylinder is adjacent to the first end of the outer cylinder, the second end of the inner cylinder is adjacent to the second end of the outer cylinder, and the outer circumference and an outer radius of the inner cylinder are less than an inner circumference and an inner radius of the outer cylinder and disposed within the inner radius of the primary wall of the outer cylinder.

Example embodiments of the present invention further include one or more developable mechanisms comprising one or more deployable arms that conform to the central hub, comprising: one or more primary developable mechanisms comprising: a curved body having a contact area on a surface of the curved body; a first end pivotably connected to a first joint of the outer cylinder; a second end, and a second joint pivotably connecting the curved body to one or more secondary developable mechanisms; the one or more secondary developable mechanisms comprising: an adapted crank-slider having a first end pivotably connected to the second joint and a second end pivotably connected to a third joint of the inner cylinder. The one or more developable mechanisms transition from a closed state, wherein the one or more primary developable mechanisms and the one or more secondary developable mechanisms are contained entirely within the outer cylinder outer circumference, to an open state wherein the inner cylinder rotates relative to the outer cylinder, forcing the one or more primary developable mechanisms and one or more secondary developable mechanisms to extend outside the outer cylinder outer circumference.

In accordance with aspects of the present invention, the connected deployable arms at the first closed state wherein the primary developable mechanisms and secondary developable mechanisms can be contained entirely within the outer cylinder outer circumference. The adapted crank-slider of each of the one or more secondary developable mechanisms can include a distal tab at first end pivotably connected to the second joint, projecting away from the center aperture and opposite a concave side of a curvilinear body of the adapted crank-slider. The one or more developable mechanisms can be arranged and shaped to conform to and/or emerge from the cylindrical surface, which in turn conforms to encapsulating shapes including one or more of cylinders, truncated cones, and tangent developed surfaces. The one or more developable mechanisms comprising the one or more primary developable mechanisms and the one or more secondary developable mechanisms in the closed state can be contained within a recessed channel of the cylindrical surface of the outer cylinder, the recessed channel disposed between the first end of the outer cylinder and the second end of the outer cylinder, and extending along a circumference thereof. The device can completely recess within the recessed channel all of the one or more developable mechanisms and deployable and/or extendable components when in the closed state, such that all of the one or more developable mechanisms and deployable and/or extendable components comprising the one or more primary developable mechanisms, the one or more secondary developable mechanisms and/or any other joints or links are constrained within a radius of curvature of the outer cylinder and each are further configured in shapes fitting inside the cylinders when fully collapsed in the closed state. The inner cylinder and the outer cylinder can be geometrically similar and concentric but not congruent, and an outer curve of the curved body of each of the one or more primary developable mechanisms can geometrically similar to a curvilinear body of the adapted crank-slider of each of the one or more secondary developable mechanisms and each can be geometrically similar to, and match, a curvature of the outer cylinder so as to be flush with the outer cylinder outer circumference in the closed state.

In accordance with aspects of the present invention, the one or more primary developable mechanisms and the one or more secondary developable mechanisms can include a plurality of components connected and disposed at equal circumferential distances around and corresponding to the outer cylinder outer circumference. The transition from the closed state to the open state can be actuated in each of the one or more developable mechanisms independently such that each deployable arm comprises an independent mechanism. Alternatively, each of the one or more developable mechanisms can be interconnected with another of the one or more developable mechanisms, limiting a number of actuators needed to transition from the closed state to the open state and allowing simultaneous deployment.

In accordance with aspects of the present invention, the inner cylinder can be rotated by electric action or electromotive force. The transition from the closed state to the open state then can be actuated by an electric motor or transducer connected to and driving rotation of the inner cylinder. Alternatively, the transition from the closed state to the open state can be actuated by inertial force or centrifugal force in reaction to centripetal acceleration. Each of the one or more developable mechanisms can be configured to create mechanical advantage to achieve motion so as to be actuated with inertial forces or centrifugal forces in reaction to centripetal acceleration and to lock into place once deployed. The one or more primary developable mechanisms can be disposed in a first plane projecting from and perpendicular to the central aperture and the one or more secondary developable mechanisms, can be disposed in a second plane projecting from and perpendicular to the central aperture, that is offset from the first plane, allowing each of the one or more primary developable mechanisms and the one or more secondary developable mechanisms to be configured with increased length around the outer cylinder without interfering with any other of the one or more developable mechanisms.

In accordance with aspects of the present invention, the first joint, the second joint and the third joint of each of the one or more developable mechanisms can comprise connect components including one or more of hinges, bearings, or bushings, pins, pegs, slots, balls-and-sockets, rotatable couplings, axles, rivets, and compliant components. The one or more of the first joint, the second joint and the third joint of the one or more developable mechanisms can include compliant components having the ability to create bistable or multistable behavior in the device. At least one of the first joint and the third joint can be a compliant mechanism. Parameters altering the appearance and function of each of the one or more developable mechanisms can include one or more of: a length of the one or more primary developable mechanisms or second links; a length of the one or more secondary developable mechanisms or third links; relative placement of second joints where the one or more primary developable mechanisms or second links and the one or more secondary developable mechanisms or third links connect a ratio of length of the one or more primary developable mechanisms or second links to the one or more secondary developable mechanisms or third links; and geometric distance between each joint.

In accordance with aspects of the present invention, at least one of the contact areas of the one or more primary developable mechanisms can be a stabilizing platform or foot. Moreover, the one or more developable mechanisms comprising deployable arms can be four-bar mechanisms or four-link mechanisms comprising: a first link comprising an outer cylinder comprising; a first end having a first annular surface bounded by a first edge having an inside radius edge and a second edge having an outside radius; a second end having a second annular surface bounded by a first edge having the inside radius and a second edge having the outside radius; a second link comprising one or more primary developable mechanisms in a first plane perpendicular to the central aperture; a third link comprising one or more secondary developable mechanisms in a second plane perpendicular to the central aperture; a fourth link comprising an inner cylinder comprising: a first end having a first annular surface bounded by a first edge having an inside radius edge and a second edge having an outside radius; and a second end having a second annular surface bounded by a first edge having the inside radius and a second edge having the outside radius.

In accordance with aspects of the present invention, the device can further include an outer cylinder or first link material, a primary developable device or second link material, a secondary developable device or third link material, an inner cylinder or fourth link material, and a joint material, each comprising one or more of a metal, a plastic, a composite material, an organic material, a ceramic material, a compliant material, and combinations thereof. Compliant elements or material can cause one or more deployable arms to be biased to preferred open and/or closed positions, reducing actuation effort from an unbiased configuration of one or more deployable arms.

In accordance with example embodiments of the present invention, A method of using a connected deployable arms device that conforms to a central hub comprises providing a connected deployable arms device; and actuating the connected deployable arms device to transitions from a first closed state to a second open state or from a second open state to a first closed state. In accordance with aspects of the present invention, the method can further include: initiating transition/transformation and/or extension from a closed state using a central hub comprising a developable surface and an inner cylinder comprising: a first end having a first annular surface; a second end having a second annular surface; a secondary wall extending between the first end and second end, defining an outer circumference of the inner cylinder, having a circumferential surface and a central aperture therethrough from the first end to the second end, the inner cylinder being concentric with, and rotatably coupled to, an outer cylinder comprising: a first end having a first annular surface; a second end having a second annular surface; a primary wall extending between the first end and the second end, defining an outer circumference of the outer cylinder, having a cylindrical surface and a central aperture therethrough from the first end to the second end. The first end of the inner cylinder is adjacent to the first end of the outer cylinder, the second end of the inner cylinder is adjacent to the second end of the outer cylinder, and wherein the outer circumference and an outer radius of the inner cylinder are less than an inner circumference and an inner radius of the outer cylinder and disposed within the inner radius of the primary wall of the outer cylinder. The method can further include rotating the inner cylinder relative to outer cylinder, thereby moving a third joint around the inner cylinder, minimizing distance between the third joint and a first joint, thereby applying force to one or more secondary developable mechanisms comprising: an adapted crankslider having a first end pivotably connected to the second joint and a second end pivotably connected to a third joint of the inner cylinder. The method can further include extending and rotating the secondary developable mechanism using second joint, and third joint movement. One or more developable mechanisms than can comprise one or more deployable arms that conform to the central hub then transition from a closed state, wherein the one or more secondary developable mechanisms and one or more primary developable mechanisms can be contained entirely within the outer cylinder outer circumference, to an open state, forcing the one or more secondary developable mechanisms to extend outside the outer cylinder outer circumference the one or more primary developable mechanisms comprising: a curved body having a contact area on a surface of the curved body; a first end pivotably connected to a first joint of the outer cylinder; a second end, and a second joint pivotably connecting the curved body to the one or more secondary developable mechanisms. The method can further include extending one or more primary developable mechanisms using movement of the first joint, deploying arms; and locking the one or more developable mechanisms into an open state. Actuation can be accomplished using any of the links (including a plurality of adapted crank-sliders, secondary developable mechanisms and/or primary developable mechanisms) in any of the one or more developable mechanisms on the developable surface and/or actuation cylinders (including inner and outer cylinders). In various embodiments, rotating even one link in one developable mechanism can actuate the other developable mechanisms, or rotate the inner cylinder with respect to the outer cylinder, which then actuates the other developable mechanisms in the device. While it is possible to actuate motions or transitions by applying force to any one link in any of the one or more developable mechanisms to actuate transition between states for the whole mechanism or the entire device, various embodiments apply force to a subset of several links of the one or more developable mechanisms simultaneously, as in the case where a plurality of secondary developable mechanisms spaced equally around the concentric inner and outer cylinders simultaneously drive a plurality of primary developable mechanisms to an open state.

In accordance with example embodiments of the present invention, a stair climbing wheel device comprises: a central hub of a wheel comprising a developable surface and an outer cylinder comprising: a first end having a first annular surface; a second end having a second annular surface; a primary wall extending between the first end and the second end, defining an outer circumference of the outer cylinder, having a cylindrical surface and a central aperture therethrough from the first end to the second end. An inner cylinder of the device comprises: a first end having a first annular surface; a second end having a second annular surface; a secondary wall extending between the first end and second end, defining an outer circumference of the inner cylinder, having a circumferential surface and the central aperture therethrough from the first end to the second end, the inner cylinder being concentric with, and rotatably coupled to, the outer cylinder. The first end of the inner cylinder is adjacent to the first end of the outer cylinder, the second end of the inner cylinder is adjacent to the second end of the outer cylinder, and wherein the outer circumference and an outer radius of the inner cylinder are less than an inner circumference and an inner radius of the outer cylinder and disposed within the inner radius of the primary wall of the outer cylinder. The device further includes one or more developable mechanisms comprising one or more deployable arms that conform to the central hub including one or more primary developable mechanisms comprising: a curved body having at least one contact area on a surface of the curved body comprising a stabilizing platform or foot configured to engage and provide traction against a stair riser or stair tread; a first end pivotably connected to a first joint of the outer cylinder; a second end, and a second joint pivotably connecting the curved body to one or more secondary developable mechanisms. The one or more secondary developable mechanisms of the device comprise: an adapted crank-slider having a first end pivotably connected to the second joint and a second end pivotably connected to a third joint of the inner cylinder. The one or more developable mechanisms transition from a closed state, wherein the one or more primary developable mechanisms and the one or more secondary developable mechanisms are contained entirely within the outer cylinder outer circumference in a recessed channel of the cylindrical surface, to an open state wherein the inner cylinder rotates relative to the outer cylinder, forcing the one or more primary developable mechanisms and one or more secondary developable mechanisms to extend outside the outer cylinder outer circumference, such that the magnitude of rotation of the inner cylinder varies the reach of extending the one or more developable mechanisms comprising one or more deployable arms thereby changeably increasing a wheel circumference of the stair climbing wheel device.

In accordance with aspects of the present invention, stair climbing wheel device can be connected to wheels of one or more of wheelchairs, transport carts, dollies, and other vehicles having wheels and hubs. The second end of the curved body of each of the one or more primary developable mechanisms can include a stabilizing platform or foot comprising a flat platform configured to engage and provide traction against a stair riser or stair tread that grips flat against the stair tread or a run causing the central hub and the wheel to lift itself as the wheel rotates. The flat platform can comprise a pivot enabling the flat platform to always remain flat against the stair tread or stair run as the wheel rotates and lifts a vehicle connected to the wheel. The flat platform can further comprise a grip component comprised of a traction inducing material. The vehicle can comprise two front wheels or four wheels that each deploy simultaneously a respective stair climbing wheel device as the vehicle or each wheel is in motion just before approaching a stairway, and after reaching a top of the stairway, fold back in to a closed state and the wheel continue rolling with the one or more developable mechanisms recessed within outer cylinder circumference and radius.

In accordance with example embodiments of the present invention, an obstacle maneuvering wheel device comprises a central hub of a wheel comprising a developable surface and an outer cylinder comprising: a first end having a first annular surface; a second end having a second annular surface; a primary wall extending between the first end and the second end, defining an outer circumference of the outer cylinder, having a cylindrical surface and a central aperture therethrough from the first end to the second end. An inner cylinder of the device comprises: a first end having a first annular surface; a second end having a second annular surface; a secondary wall extending between the first end and second end, defining an outer circumference of the inner cylinder, having a circumferential surface and the central aperture therethrough from the first end to the second end, the inner cylinder being concentric with, and rotatably coupled to, the outer cylinder. The first end of the inner cylinder is adjacent to the first end of the outer cylinder, the second end of the inner cylinder is adjacent to the second end of the outer cylinder, and wherein the outer circumference and an outer radius of the inner cylinder are less than an inner circumference and an inner radius of the outer cylinder and disposed within the inner radius of the primary wall of the outer cylinder. The device further includes one or more developable mechanisms comprising one or more deployable arms that conform to the central hub, including one or more primary developable mechanisms comprising: a curved body having at least one contact area on a surface of the curved body comprising a foot configured to engage and provide traction and assist maneuverability of a vehicle over rough terrain by increasing diameter of the wheel and transmitting greater torque through rotation one or more of an electric motor, a transducer, and an engine; a first end pivotably connected to a first joint of the outer cylinder; a second end, and a second joint pivotably connecting the curved body to one or more secondary developable mechanisms. The one or more secondary developable mechanisms of the device comprise: an adapted crank-slider having a first end pivotably connected to the second joint and a second end pivotably connected to a third joint of the inner cylinder. The one or more developable mechanisms transition from a closed state, wherein the one or more primary developable mechanisms and the one or more secondary developable mechanisms are contained entirely within the outer cylinder outer circumference in a recessed channel of the cylindrical surface, to an open state wherein the inner cylinder rotates relative to the outer cylinder, forcing the one or more primary developable mechanisms and one or more secondary developable mechanisms to extend outside the outer cylinder outer circumference, such that the magnitude of rotation of the inner cylinder varies the reach of extending the one or more developable mechanisms comprising one or more deployable arms thereby changeably increasing a wheel circumference and diameter to enable the vehicle to roll on the wheel over obstacles.

In accordance with aspects of the present invention, wherein when extended in the open state, the one or more developable mechanisms can include one or more deployable arms that extend reach or diameter of the wheel up to 300% of the original wheel diameter. The device can temporarily increase the diameter of the wheel, and create a griping mechanism using at least one contact area on the surface of the curved body comprising the foot, configured to engage and provide traction for the wheel to anchor the wheel using an angle of the curved body relative to a direction of motion of the wheel for climbing over one or more of boulders, curbs, holes, and ditches. The one or more developable mechanisms can include one or more deployable arms of the wheel that are extended only as traction spikes to dig a wheel out of one or more of sand, mud, and snow.

In accordance with example embodiments of the present invention, a deployable arm device for a drone comprises: a central hub comprising, a drone core comprising a computing device and electrical connections to one or more electric motors, a developable surface and an outer cylinder comprising: a first end having a first annular surface; a second end having a second annular surface; a primary wall extending between the first end and the second end, defining an outer circumference of the outer cylinder, having a cylindrical surface and a central aperture therethrough from the first end to the second end. An inner cylinder of the device comprises: a first end having a first annular surface; a second end having a second annular surface; a secondary wall extending between the first end and second end, defining an outer circumference of the inner cylinder, having a circumferential surface and the central aperture therethrough from the first end to the second end, the inner cylinder being concentric with, and rotatably coupled to, the outer cylinder. The first end of the inner cylinder is adjacent to the first end of the outer cylinder, the second end of the inner cylinder is adjacent to the second end of the outer cylinder, and wherein the outer circumference and an outer radius of the inner cylinder are less than an inner circumference and an inner radius of the outer cylinder and disposed within the inner radius of the primary wall of the outer cylinder. The device further includes one or more developable mechanisms comprising one or more deployable arms that conform to the central hub, comprising: one or more primary developable mechanisms comprising: a curved body having a contact area on a surface of the curved body; a first end pivotably connected to a first joint of the outer cylinder; a second end rotatably connected to one or more collapsible lockable propellers comprising one or more electrical connections connecting to the drone core or electric motor which in turn is rotatably connected to the one or more collapsible lockable propellers, and a second joint pivotably connecting the curved body to one or more secondary developable mechanisms. The one or more secondary developable mechanisms of the device comprise: an adapted crank-slider having a first end pivotably connected to the second joint and a second end pivotably connected to a third joint of the inner cylinder. The one or more developable mechanisms transition from a closed state, wherein the one or more primary developable mechanisms and the one or more secondary developable mechanisms are contained entirely within the outer cylinder outer circumference, to an open state wherein the inner cylinder rotates relative to the outer cylinder, forcing the one or more primary developable mechanisms and one or more secondary developable mechanisms to extend outside the outer cylinder outer circumference and deploying and locking the one or more collapsible lockable propellers.

In accordance with aspects of the present invention, the drone can comprise a multirotor, or multicopter drone that can be made to be an expanding bicopter, tricopter, quadcopter, hexacopter, or octocopter drone. Multicopters of six or eight rotors are ideal for heavy lifting drones and the ability of the device to reduce size for storage can be particularly useful. The quadcopter drone can comprise four (4) arms that have one or more electrical motors attached to the second end of each of the curved bodies of the one or more primary developable mechanisms comprising deployable arms. The one or more primary developable mechanisms can be disposed in a first plane projecting from and perpendicular to the central aperture and the one or more secondary developable mechanisms, can be disposed in a second plane projecting from and perpendicular to the central aperture, that is offset from the first plane, allowing each of the one or more primary developable mechanisms and the one or more secondary developable mechanisms to be configured with increased length around the outer cylinder without interfering with any other of the one or more developable mechanisms, and providing each of the one or more collapsible locking propellers area to rotate without interfering with a radius of each other of the one or more collapsible locking propellers. In another embodiment, one or more developable mechanisms can be deployed on a drone as deployable arms of a landing gear that extend to allow a wider base. The landing gear can be electrically actuated, using a computing device or other means understood by one of ordinary skill in the art, such as by using an internal planetary gear, and can be fold back into the drone after takeoff. The deployable arm device can include one or more planetary gears. The one or more planetary gears can comprise intermediary gear teeth and intervene between the inner cylinder comprising external gear teeth and the outer cylinder comprising internal gear teeth, and the one or more planetary gears, the inner cylinder, and the outer cylinder mesh together to control transition from the closed state to the open state and back to the closed state.

In accordance with example embodiments of the present invention, a deployable gear device of multiple linkages includes a central hub comprising a developable surface and an outer cylinder comprising: a first end having a first annular surface; a second end having a second annular surface; a primary wall extending between the first end and the second end, defining an outer circumference of the outer cylinder, having a cylindrical surface and a central aperture therethrough from the first end to the second end. An inner cylinder of the device comprises: a first end having a first annular surface; a second end having a second annular surface; a secondary wall extending between the first end and second end, defining an outer circumference of the inner cylinder, having a circumferential surface and the central aperture therethrough from the first end to the second end, the inner cylinder being concentric with, and rotatably coupled to, the outer cylinder. The first end of the inner cylinder is adjacent to the first end of the outer cylinder, the second end of the inner cylinder is adjacent to the second end of the outer cylinder, and wherein the outer circumference and an outer radius of the inner cylinder are less than an inner circumference and an inner radius of the outer cylinder and disposed within the inner radius of the primary wall of the outer cylinder. The device further includes one or more developable mechanisms comprising one or more deployable arms that conform to the central hub, comprising: one or more primary developable mechanisms comprising: a curved body having a contact area on a surface of the curved body; a first end pivotably connected to a first joint of the outer cylinder; a second end comprising a hardened surface area forming gear cogs or gear teeth projecting radially from the outer cylinder, and a second joint pivotably connecting the curved body to one or more secondary developable mechanisms. The one or more secondary developable mechanisms of the device comprise: an adapted crank-slider having a first end pivotably connected to the second joint and a second end pivotably connected to a third joint of the inner cylinder. The one or more developable mechanisms transition from a closed state, wherein the one or more primary developable mechanisms and the one or more secondary developable mechanisms are contained entirely within the outer cylinder outer circumference and do not interfere with or mesh with another gear or device, to an open state wherein the inner cylinder rotates relative to the outer cylinder, forcing the one or more primary developable mechanisms and one or more secondary developable mechanisms to extend outside the outer cylinder outer circumference, creating gear cogs or gear teeth projecting radially from the outer cylinder together with mesh point grooves corresponding to points on the outer cylinder, the gear cogs or gear teeth offsetting from a radius of the device forming an expanding gear to engage or disengage to overlap a radius of, make contact and mesh with one or more of gears, drive shafts and toothed parts to transmit torque thereto.

In accordance with aspects of the present invention, multiples of linkages including the one or more developable mechanisms comprising one or more deployable arms, can be further configured to align with one or more of gears, drive shafts and toothed parts to impart desired gear parameters comprising one or more of rotational direction, contact forces, pitch circle, root diameter, outside diameter bottom land, dedendum, and addendum.

In accordance with example embodiments of the present invention, an expandable boring tool includes a central hub comprising a developable surface and an outer cylinder comprising: a first end having a first annular surface; a second end having a second annular surface; a primary wall extending between the first end and the second end, defining an outer circumference of the outer cylinder, having a cylindrical surface and a central aperture therethrough from the first end to the second end. An inner cylinder of the tool includes a first end having a first annular surface; a second end having a second annular surface; and a secondary wall extending between the first end and second end, defining an outer circumference of the inner cylinder, having a circumferential surface and the central aperture therethrough from the first end to the second end, the inner cylinder being concentric with, and rotatably coupled to, the outer cylinder. The first end of the inner cylinder is adjacent to the first end of the outer cylinder, the second end of the inner cylinder is adjacent to the second end of the outer cylinder, and wherein the outer circumference and an outer radius of the inner cylinder are less than an inner circumference and an inner radius of the outer cylinder and disposed within the inner radius of the primary wall of the outer cylinder. The tool further includes one or more developable mechanisms comprising one or more deployable arms that conform to the central hub, comprising: one or more primary developable mechanisms comprising: a curved body having a contact area on a surface of the curved body; a first end pivotably connected to a first joint of the outer cylinder; a second end comprising one or more of cutting edges, blades and hardened surfaces, and a second joint pivotably connecting the curved body to one or more secondary developable mechanisms. The one or more secondary developable mechanisms of the tool comprise: an adapted crank-slider having a first end pivotably connected to the second joint and a second end pivotably connected to a third joint of the inner cylinder. The one or more developable mechanisms transition from a closed state, wherein the one or more primary developable mechanisms and the one or more secondary developable mechanisms are contained entirely within the outer cylinder outer circumference, to an open state wherein the inner cylinder rotates relative to the outer cylinder, forcing the one or more primary developable mechanisms and one or more secondary developable mechanisms to extend outside the outer cylinder outer circumference, thereby creating a boring tool or drill with expandable diameter in the open state to contact a perimeter or surface of a boring hole, drilling or excavation site.

In accordance with aspects of the present invention, the one or more developable mechanisms and the outer cylinder can be configured to together to comprise one or more of cutting edges, blades, margins, lands, flutes, lips and abrasive surfaces. The one or more developable mechanisms can be configured and positioned to support a load induced by rotation while engaging in one or more of boring, drilling and excavating.

BRIEF DESCRIPTION OF THE FIGURES

These and other characteristics of the present invention will be more fully understood by reference to the following detailed description in conjunction with the attached drawings, in which:

FIG. 9 is a diagrammatic illustration depicting an example hard stop limit on a link to limit how far a developable mechanism can expand;

DETAILED DESCRIPTION

Figure 1:
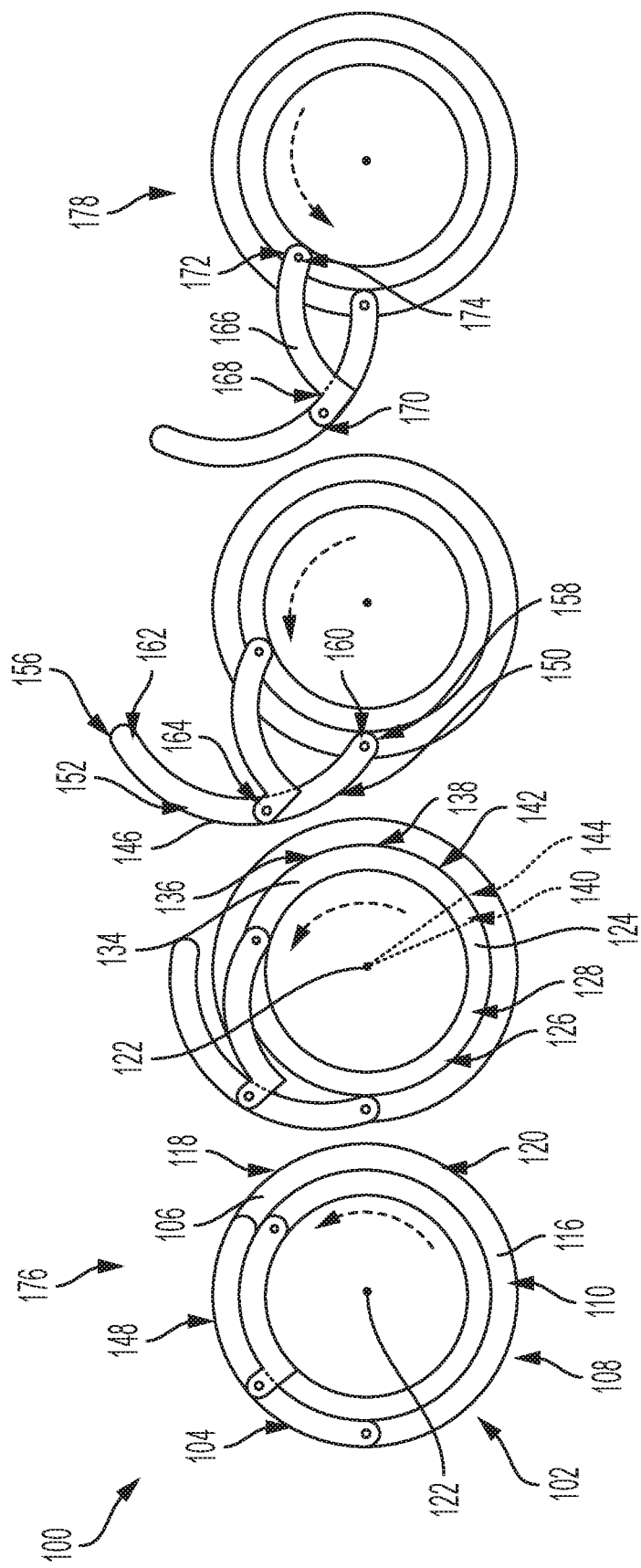
FIG. 1 is a diagrammatic illustration depicting an example actuation sequence of individual members.

An illustrative embodiment of the present invention relates to a method and apparatus for connected deployable arms off of cylindrical surfaces including an outer cylinder defining an outer circumference and an inner cylinder concentric with the outer cylinder around a central aperture, one or more primary developable mechanisms linked to one or more secondary developable mechanisms. The deployable arms transition from a first closed state wherein the primary developable mechanisms and secondary developable mechanisms are contained entirely within the outer cylinder outer circumference to a second open state wherein the inner cylinder rotates relative to the outer cylinder, forcing the primary developable mechanisms and secondary developable mechanisms to extend outside the outer cylinder outer circumference.

FIGS. 1 through 14, wherein like parts are designated by like reference numerals throughout, illustrate an example embodiment or embodiments of developable mechanisms and deployable arms, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an example actuation sequence of individual components of an example connected deployable arms device 100 used for increased mobility. Each of the four views of the device 100 demonstrates how the different components interconnect and move relative to one another, where the leftmost view of the device 100 represents an initial closed state 176 and tracks the result of a rotational force applied, represented by an arrow, as it rotates in the direction of the arrow and extends the device 100 into an open state 178 wherein the connected deployable arms device 100 is fully deployed. Starting with the leftmost view and proceeding to the right most view, the connected deployable arms device 100 connected deployable arms device 100 comprises a central hub 102 comprising a developable surface 104 and an outer cylinder 106, which can be used as e.g. hub components for a wheel or any rotational or central hub of a moving vehicle, as understood by one of ordinary skill in the art. The outer cylinder 106 can be a hub itself or a component of a hub or hub assembly. The outer cylinder 106 comprises a first end 108 extending out of the page, having a first annular surface 110 that may be an external surface of a hub 102 or hub assembly, a second end 112 having a second annular surface 114 extending into the page and obscured in the figure; a primary wall 116 extending between the first end and the second end, defining an outer circumference 118 of the outer cylinder 106, having a cylindrical surface 120. A central aperture 122 extends therethrough from the first end 108 to the second end 112. Within the outer cylinder 106 is positioned and coupled an inner cylinder 124 comprising: a first end 126 extending out of the page and having a first annular surface 128; a second end 130 extending into the page and having a second annular surface 132 that is obscured in the figure. A secondary wall 134 extends between the first end and second end, defining an outer circumference 136 of the inner cylinder 124, having a circumferential surface 138 and the central aperture 122 therethrough from the first end 126 to the second end 130, the inner cylinder 124 being concentric with, and rotatably coupled to, the outer cylinder 106. The first end 126 of the inner cylinder 124 is adjacent to the first end of the outer cylinder 106, the second end 130 of the inner cylinder 124 is adjacent to the second end 112 of the outer cylinder 106, and wherein the outer circumference 136 and an outer radius 140 of the inner cylinder 124 are less than an inner circumference 142 and an inner radius 144 of the outer cylinder 106 and disposed within the inner radius 144 of the primary wall 116 of the outer cylinder 106. In this way the two actuating cylinders, 106, 124, operate as a unit and can turn in unison or bear loads or forces together, except when initiating actuation, in which case they function independently and move relative to each other.

The two actuating cylinders, 106, 124 comprise dynamic attachments or connections one or more developable mechanisms 146 comprising one or more deployable arms 148 that conform to the central hub 102. They comprise one or more primary developable mechanisms 150 comprising: a curved body 152 having a contact area 154 on a surface 156 of the curved body; a first end 158 pivotably connected to a first joint 160 of the outer cylinder 106; a second end 162, and a second joint 164 pivotably connecting the curved body to one or more secondary developable mechanisms 166. The working surfaces or ends are generally disposed upon the one or more primary developable mechanisms 150. The one or more secondary developable mechanisms 166 extend and adjust the components of the deployable arms 148 including the one or more primary developable mechanisms 150. The one or more secondary developable mechanisms 166 comprise an adapted crank-slider 168 having a first end 170 pivotably connected to the second joint and a second end 172 pivotably connected to a third joint 174 of the inner cylinder 124. The outer cylinder 106, inner cylinder 124, one or more primary developable mechanisms 150, the one or more secondary developable mechanisms 166, and joints or connecters thereof can be constructed of various materials including, but not limited to, metals, plastics, ceramics, composites, and other load bearing materials of suitable strength and physical properties as understood by one of ordinary skill in the art.

The one or more developable mechanisms 146 transition from a closed state 176 in the leftmost view, wherein one or more primary developable mechanisms 150 and the one or more secondary developable mechanisms 166 are contained entirely within the outer cylinder 106 outer circumference, to an open state 178 in the rightmost view, wherein the inner cylinder 124 rotates relative to the outer cylinder 106, forcing the one or more primary developable mechanisms 150 and one or more secondary developable mechanisms 166 to extend outside the outer cylinder 106 outer circumference. In this open state 178, or states intermediate thereto, the device 100 can be used to increase range and mobility, where one having ordinary skill in the art understands that the one or more developable mechanisms 146 comprising one or more deployable arms 148 can be multiplied around the hub 102 so as to each constitute a multitude of one or more developable mechanisms 146 comprising one or more deployable arms 148 one or more developable mechanisms 146 comprising one or more deployable arms 148, spaced around the outer cylinder 106 (equally or differently in even or odd numbered configurations) so as to each perform the same respective functions.

Figure 2:
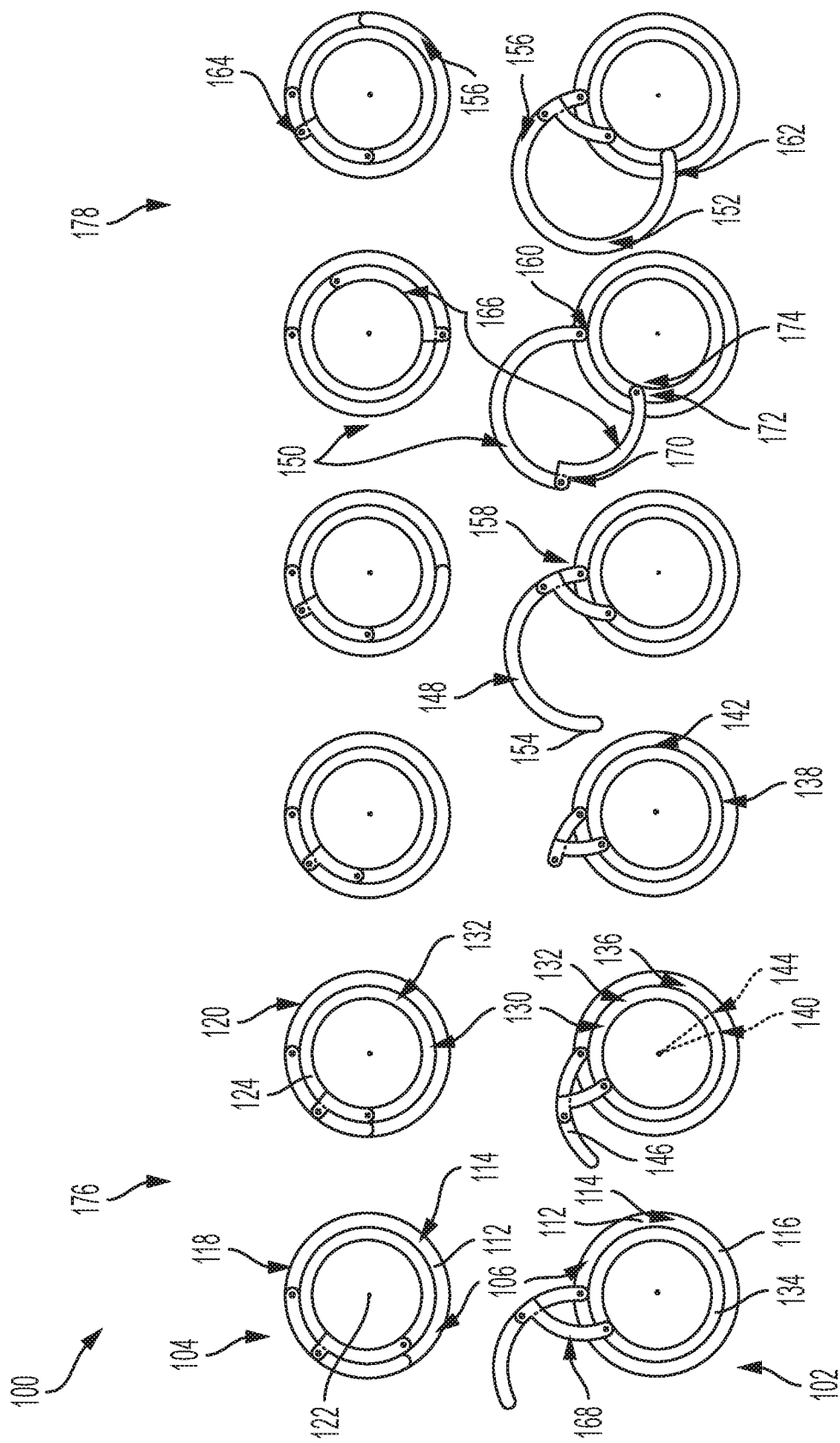
FIG. 2 is a diagrammatic illustration depicting an example shape variations from changing the three parameters.

FIG. 2 depicts an example shape variations from changing three parameters of the device 100, and demonstrates the opposite side of the device 100, providing a clear view of a second end 112 of the outer cylinder 106 having a second annular surface 114 with a primary wall 116 extending between the first end 108 and the second end 112, as well as a second end 130 inner cylinder 124 comprising having a second annular surface 132, and with a secondary wall 134 extending between the first end 126 and the second end 130. FIG. 2 demonstrates how the relative sizes and shapes of the one or more primary developable mechanisms 150 and one or more secondary developable mechanisms 166 in turn determine the configuration as deployed in the open state 178, which in turn enables various different uses, as would be understood by one of skill in the art.

Figure 3:
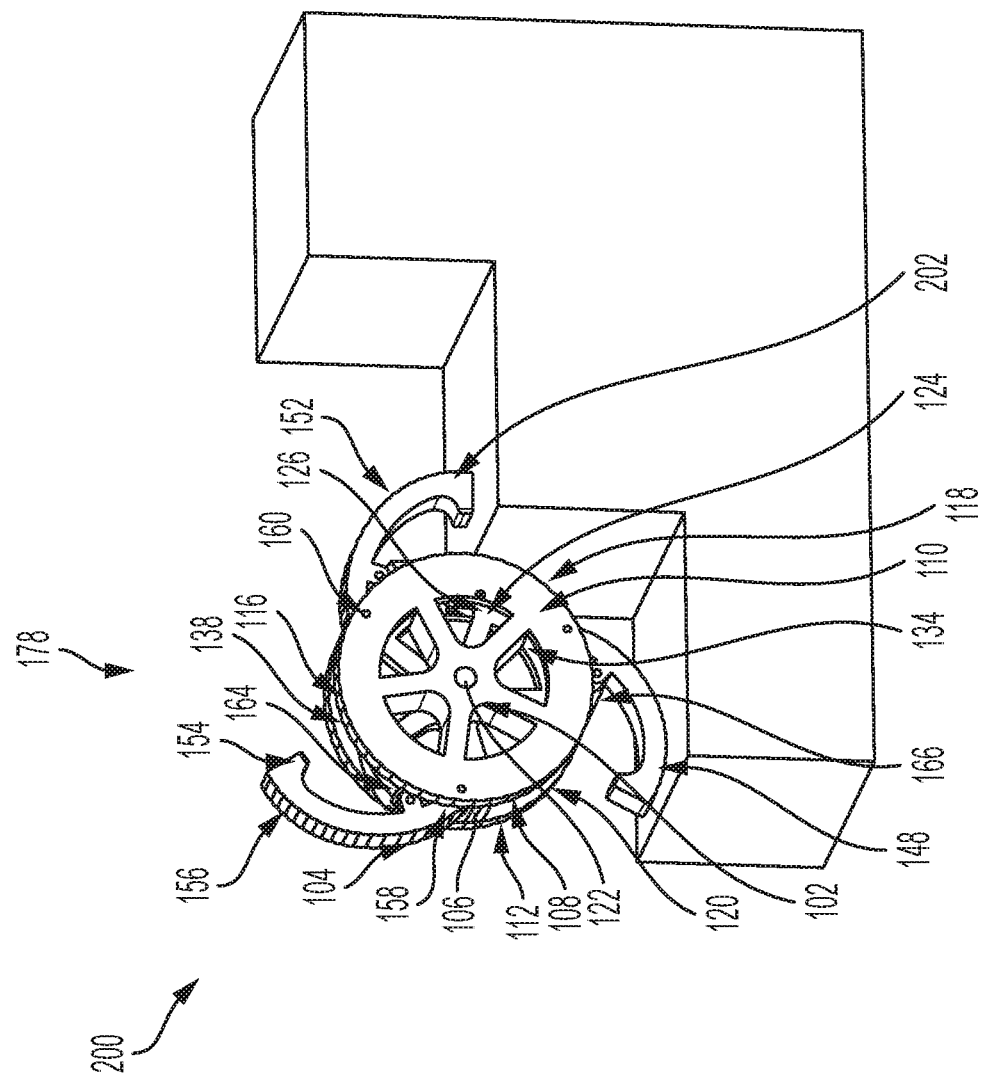
FIG. 3 is a diagrammatic illustration depicting an example of deployed wheel climbing stairs.

FIG. 3 depicts an example of a deployed stair climbing wheel device 200 climbing stairs using the flat platform 202 or foot 202 to contact and engage the stairs. The wheel mechanism initially begins as a cylindrical surface 120 with the arms 148 concealed in the wheel 200. Applications for this adjustable and deployable device 200 include, but are not limited to wheelchairs, transport carts, dollies, and other vehicles. As depicted, each deployed arm 148 has a platform 202 on the end that can grip flat against the run and lift itself as the wheel 200 rotates. This flat platform 202 can also be on its own pivot which would allow it to always stay flat against the stair run as the wheel 200 rotates and lifts the vehicle. The vehicle can have the two front wheels, or even all four, deploy simultaneously and approach the steps at the same time. The deployment of these arms 148 can happen as the vehicle/wheel is in motion just before it approaches the steps. After reaching the top, the wheel arms 148 simply fold back in and the wheel 200 can continue rolling as normal in the undeployed, closed state 176.

Figure 4:
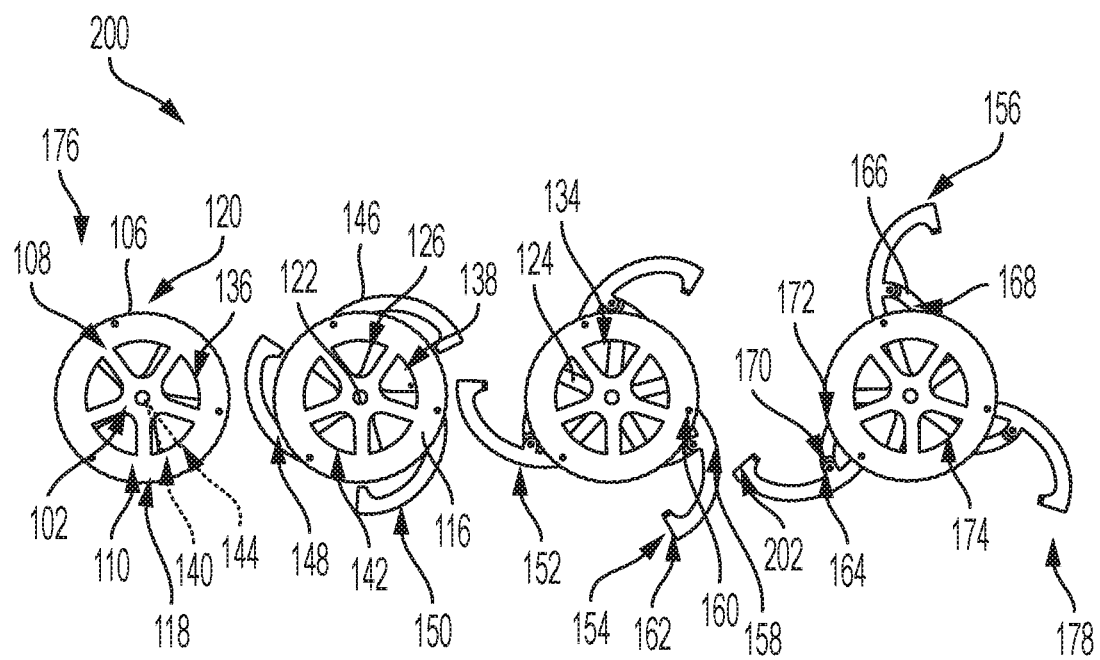
FIG. 4 is a diagrammatic illustration depicting an example actuation sequence on wheel.

FIG. 4 depicts an example actuation sequence for the stair climbing wheel device 200. As the inner cylinder 124 (link 4) rotates, it forces the adapted crank-slider 168 of the one or more secondary developable mechanisms 166 (link 3) to push out the one or more primary developable mechanisms 150 (link 2) at the point of the second joint 164, creating mechanical advantage for deployment, leveraging the one or more primary developable mechanisms 150 outward and away from the central aperture 122. Depending on the magnitude of rotation of the inner cylinder 124, the extending arms 148 can have varying reach as seen in the figure. This is especially useful for changes in step sizes or encountered obstacles that require adjustment while not arresting overall forward motion.

Figure 5:
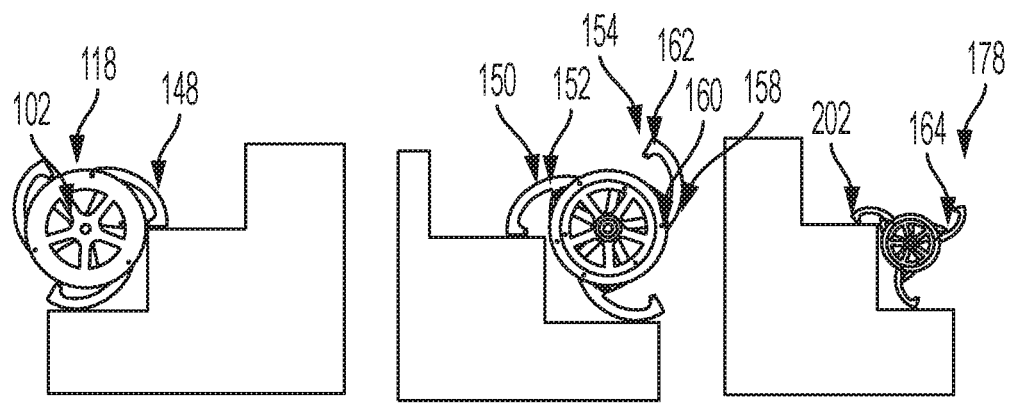
FIG. 5 is a diagrammatic illustration depicting the same example wheel shown in 3 situations of larger or smaller step sizes wherein deployment amount is adaptive to the needs of the stair/obstacle size.

FIG. 5 depicts the same example stair climbing wheel device 200 shown in 3 situations of larger or smaller step sizes wherein deployment amount is adaptive to the needs of the stair/obstacle size. The same wheel mechanism can be broadened to produce an obstacle maneuvering wheel device to assist maneuverability of any rough terrain vehicle. In theory, with a large enough diameter wheel (and powerful enough motor), a vehicle can roll over most obstacles. However, it isn't practical to always increase the wheel size. This mechanism can essential temporarily increase the diameter of the wheel, and also have ideal "tread" by creating a griping mechanism or platform 202 for the wheel to anchor itself to. Taking the stair climbing mechanism, the same idea applies for climbing over boulders of varying sizes, rolling over ditches, and getting a vehicle over any obstacle as long as it is within the reach of the extended arms 148. These extended arms 148 can extend the reach (diameter) of the wheel as much as 300% the original size. The same concept of the wheel can be applied to extend out only smaller amounts to simply have enough traction to dig a wheel out of the sand, mud, or snow.

Figure 6:
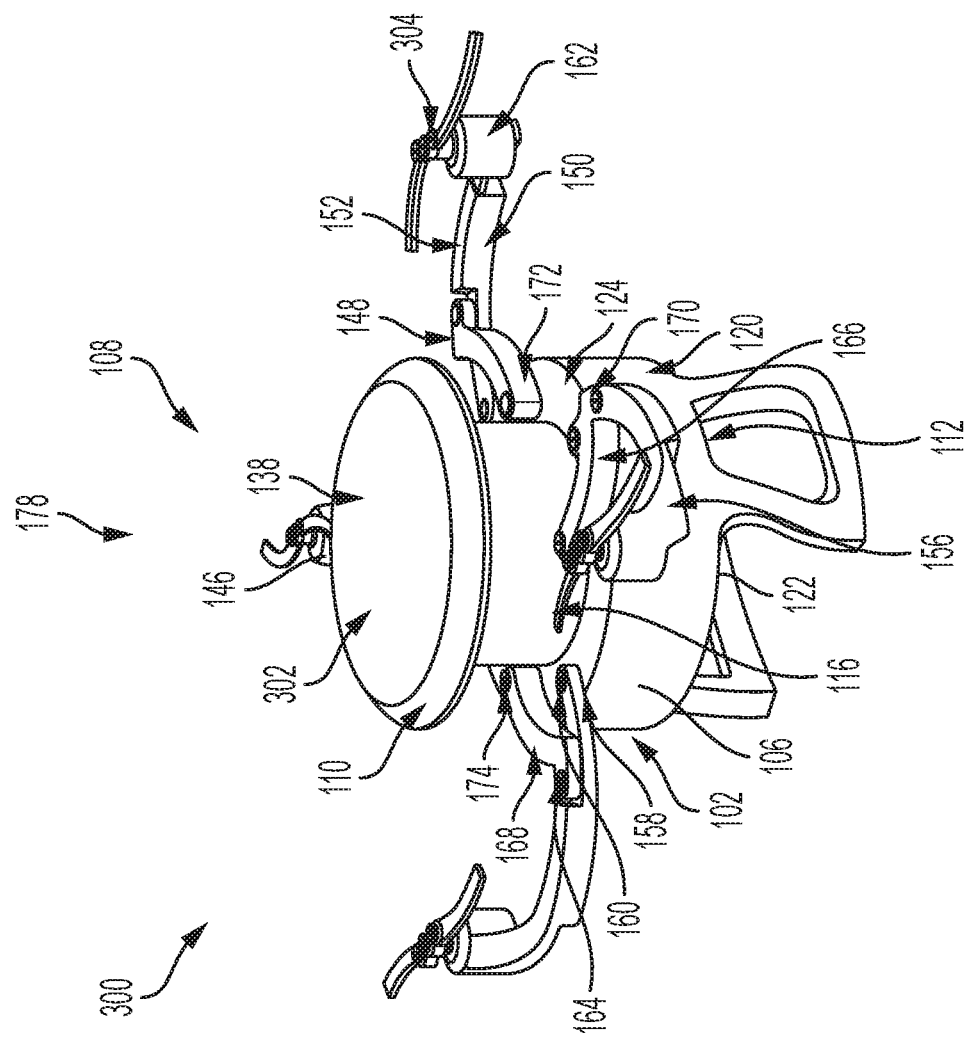
FIG. 6 is a diagrammatic illustration depicting an example deployable quadcopter drone.
Figure 7:
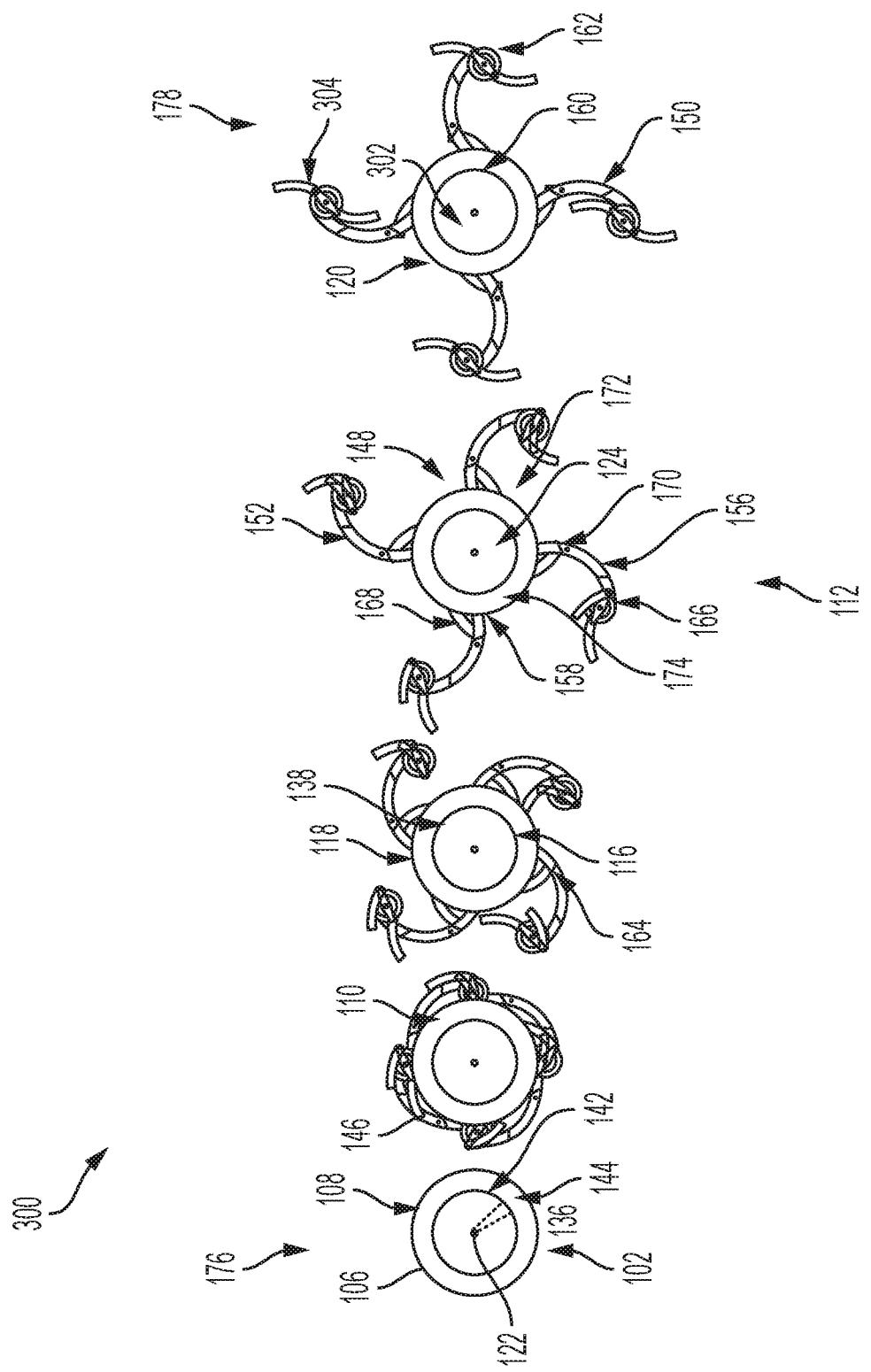
FIG. 7 is a diagrammatic illustration depicting an example deployment sequence of a drone.

FIG. 6 depicts an example deployable quadcopter drone device 300. Using the same extending arms 148 or linkages, one can create an expanding quadcopter drone. Using the same method of having an inner cylinder 124 rotate, the device 300 pushes out the arms 148 or the one or more primary developable mechanisms 150 that hold the propellers 304. Uniquely to the drone, the one or more primary developable mechanisms 150 (link 2) has an electric motor attached to each end. The deployable quadcopter drone can drone core 302 housing a computing device 700 that controls operation of the components including the inner cylinder 124 and the one or more secondary developable mechanisms 166. FIG. 7 depicts an example deployment sequence of a drone, using the same principles as discussed above.

Figure 8:
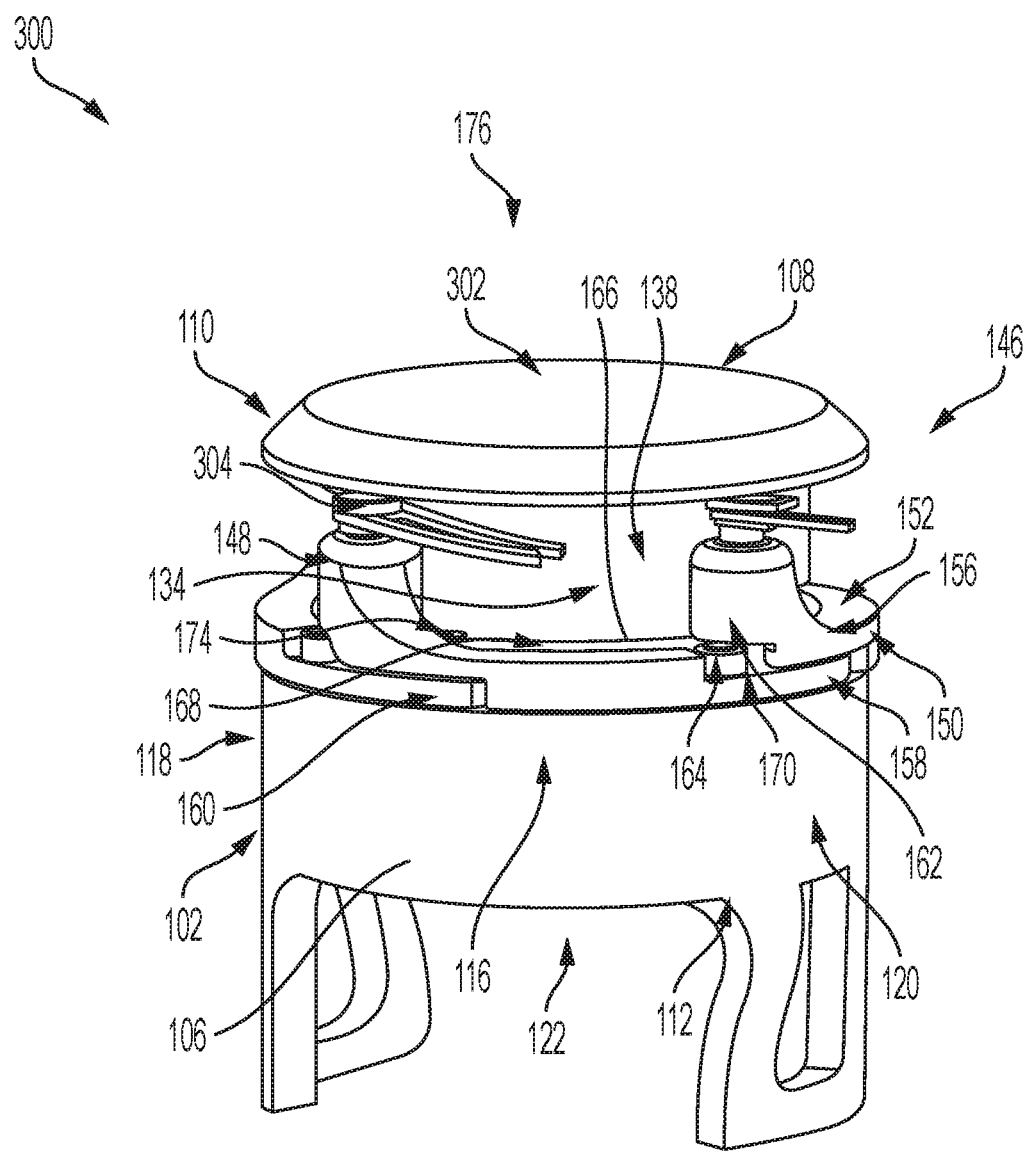
FIG. 8 is a diagrammatic illustration depicting an example of double plane linkages.

FIG. 8 depicts an example of double plane linkages to extend the length of the arms 148 and overall diameter of the drone by incorporating the one or more primary developable mechanisms 150 that hold the propellers 304 and the one or more secondary developable mechanisms 166 on different planes perpendicular to the central aperture 122, so that as they fold and extend the components overlap but do not interfere while they are safely operated on different planes. The propeller 304 diameter can be altered by the adjustment of the reach of the arms 148 mid-flight to allow the drone to contract and fit into small gaps then expand again for more stabilization and control.

FIG. 9 depicts an example one or more hard stop limits 180 on one or more links or one or more developable mechanisms 146 or to limit how far one or more developable mechanisms 146 can expand during deployment or transition from an open state 176 to a closed state 178.

Figure 10:
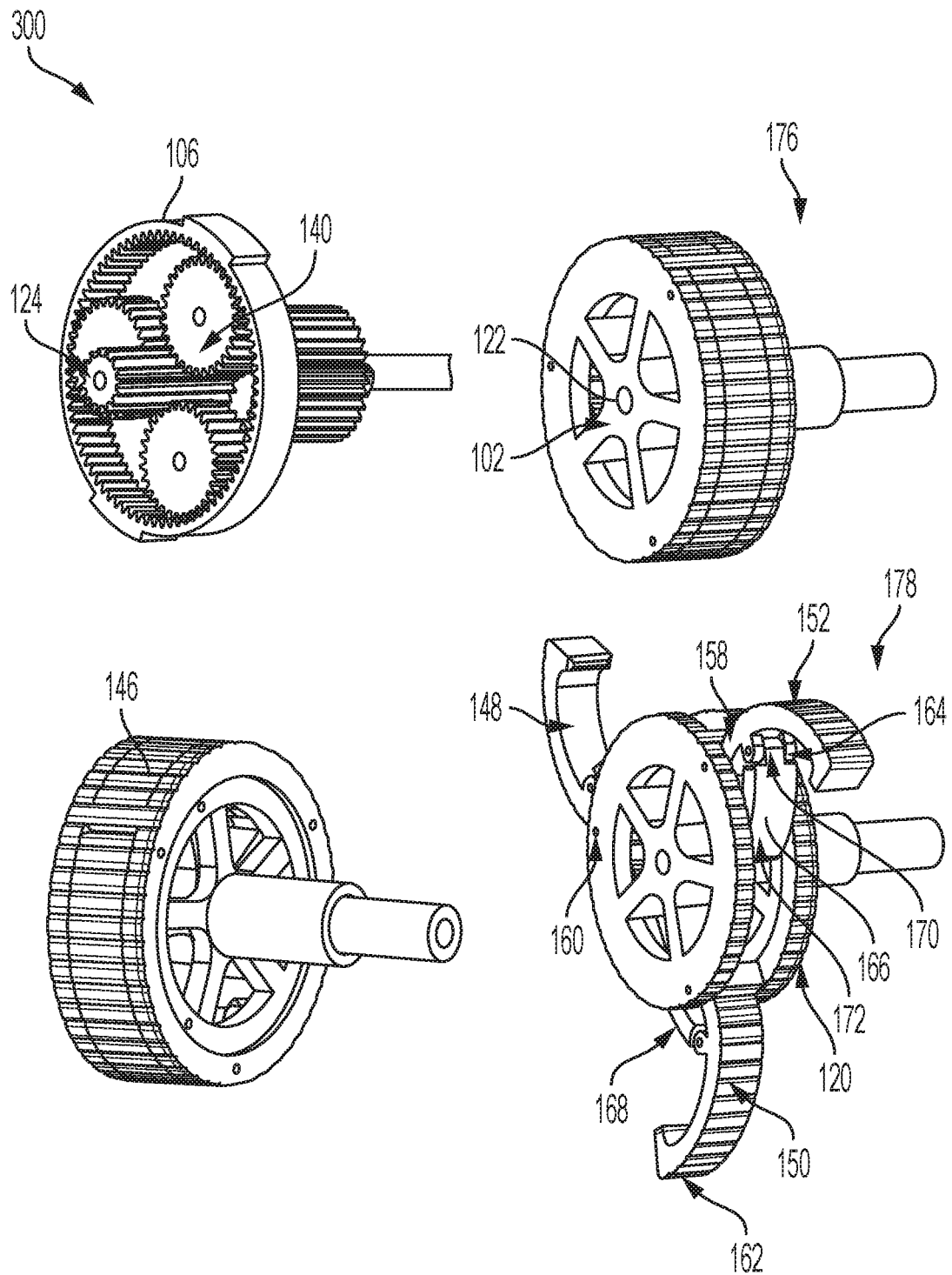
FIG. 10 is a diagrammatic illustration depicting an example deployable arm device comprising one or more planetary gears.

FIG. 10 depicts an example deployable arm device 300, wherein the deployable arm device 300 comprises one or more planetary gears 140. The one or more planetary gears 140 comprise intermediary gear teeth and intervene between the inner cylinder 124 comprising external gear teeth and the outer cylinder 106 comprising internal gear teeth, and the one or more planetary gears 140, the inner cylinder 124, and the outer cylinder 106 mesh together to control transition from the closed state to the open state and back to the closed state.

Figure 11:
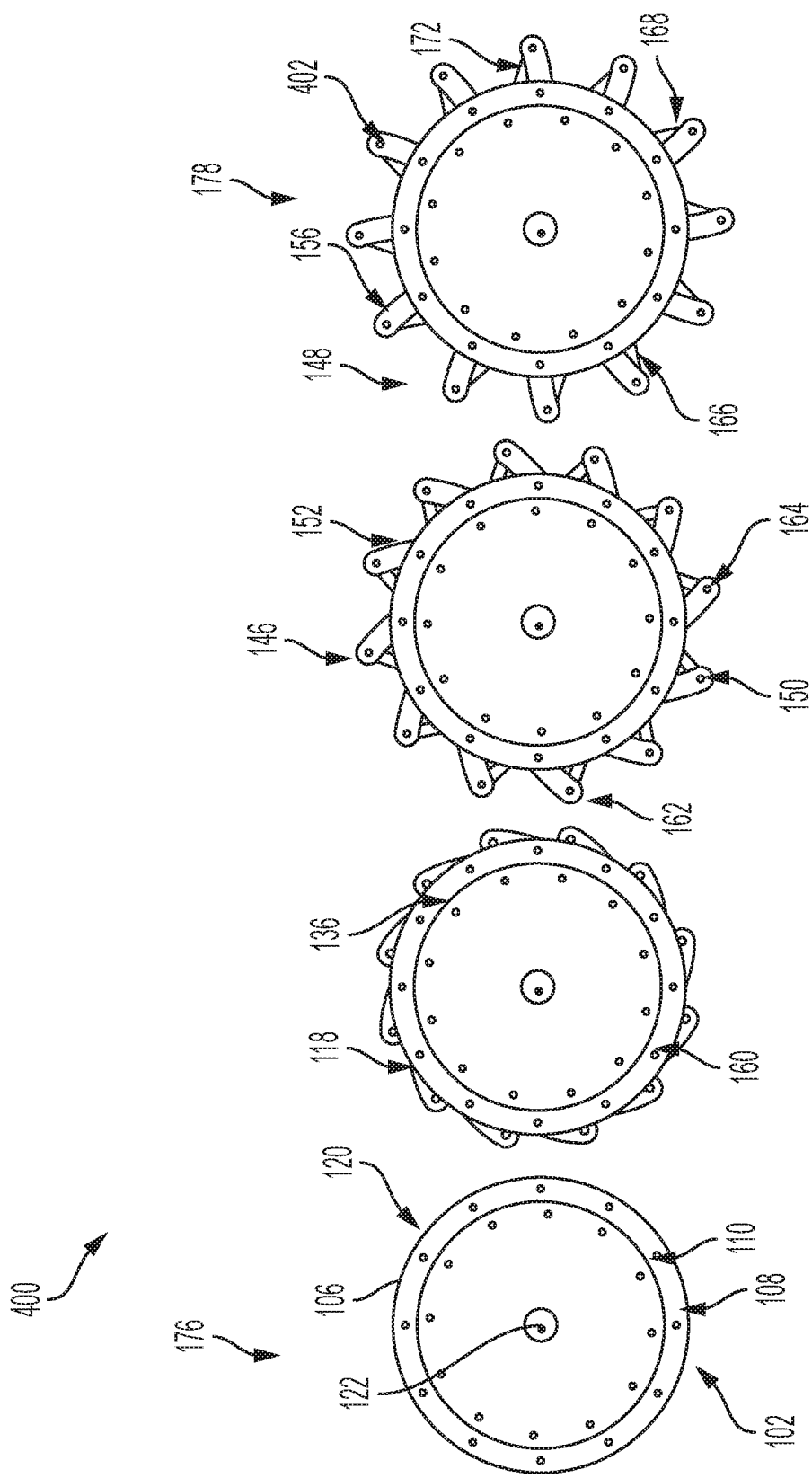
FIG. 11 is a diagrammatic illustration depicting an example deployable gear actuation sequence.

FIG. 11 depicts an example deployable gear 400 actuation sequence. Adding many multiples of the same linkages (e.g. the one or more primary developable mechanisms 150 and the one or more secondary developable mechanisms 166), an expanding gear 400 can be made wherein the one or more primary developable mechanisms 150 that hold the propellers 304 and the one or more secondary developable mechanisms 166 can be projected to form external gear cogs or gear teeth 402. The linkages geometry can be customized to better fit the gear shape. This could be used to engage or disengage with other gears or drive shafts.

Figure 12:
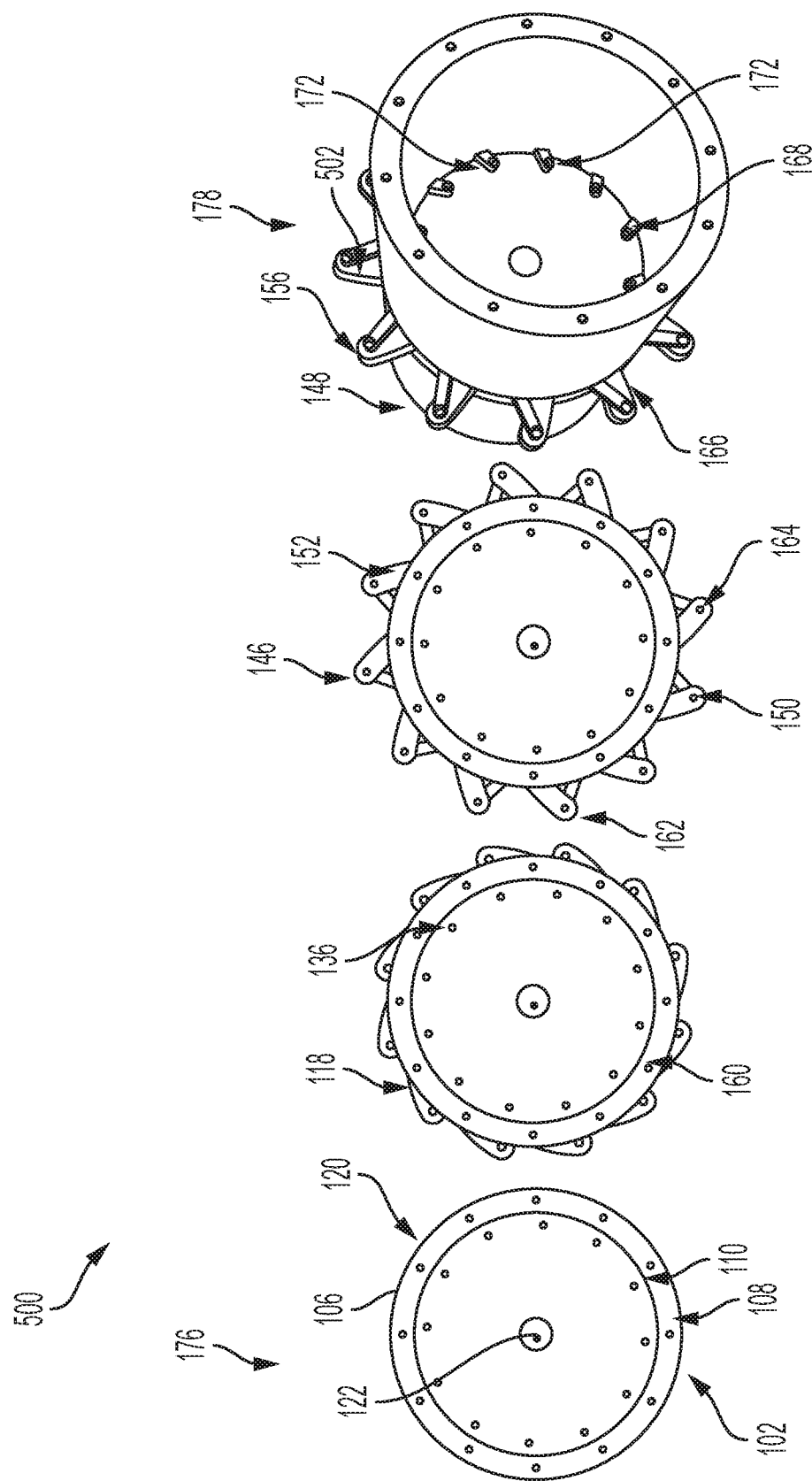
FIG. 12 is a diagrammatic illustration depicting an example deployable boring tool or drill actuation sequence.

FIG. 12 depicts a structure similar to FIG. 11 that includes drill bit features that enable an example deployable boring tool 500 or drill 500 having an expandable diameter actuation sequence. The boring tool 500 or drill 500 comprises cutting edges 502, blades or hardened surfaces, that may be mounted on ends, edges or sides of mechanisms including but not limited to the one or more primary developable mechanisms 150, that are thereby expanded to the deployed open position in the open state 178 to contact the perimeter or surface of a boring hole, drilling or excavation site. The drill or boring tool 500 with expandable diameter projecting cutting edges 502 extend out from the outer cylinder 106 in vectors perpendicular to the central aperture 122.

Figure 13:
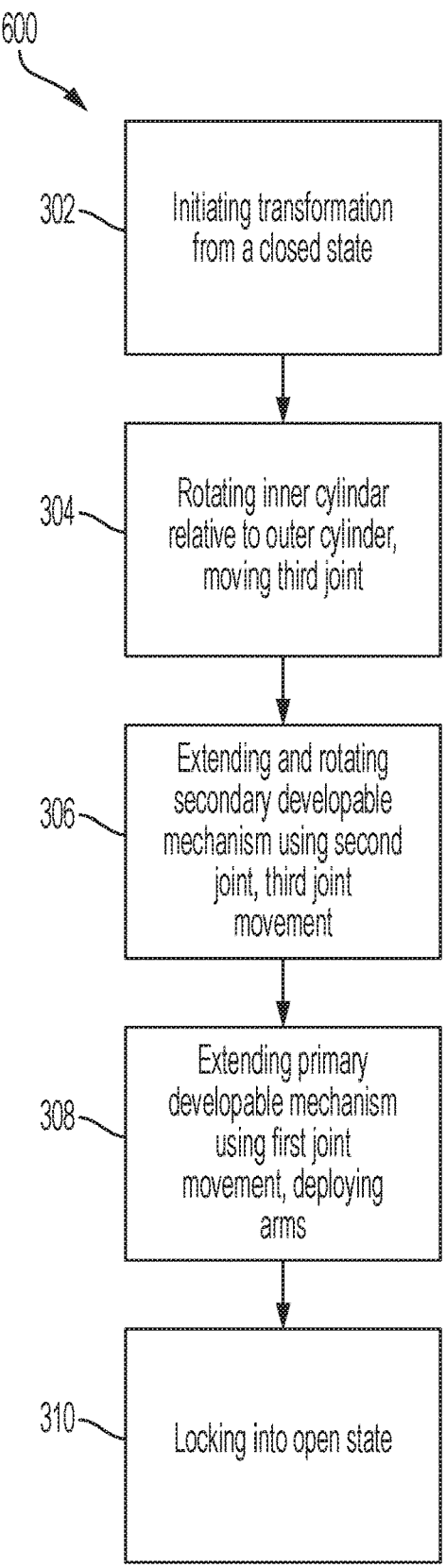
FIG. 13 is a diagrammatic illustration depicting an example method for deploying connected deployable arms to improve mobility.

FIG. 13 depicts an example method 600 for deploying connected deployable arms 148 to improve mobility. The method begins at Step 302, the method, including by using motion or a computing device 700, initiates extension or transformation from a closed state 176, which can be performed by electronic commands delivered to an electric motor connected to, and driving the inner cylinder 124. Alternatively, other forces applied, including electromotive force, user input and rotational motion are applied to initiate the transformation. At Step 304, rotating the inner cylinder 124 relative to outer cylinder 106 moves third joint 174 closer to the first joint 160, forcing the one or more secondary developable mechanisms 166 toward the one or more primary developable mechanisms 150 due to the decreasing distance between joints. At Step 306, the transition extends and rotates the one or more secondary developable mechanisms 166 using second joint 164, furthering third joint 174 movement. At Step 308, extending and rotating the one or more primary developable mechanisms 150 occurs from using first joint rotational movement brought on by the increasingly closer moving components, deploying arms 148. At Step 310, the transition is completed to the open state 178 by locking the one or more developable mechanisms 146 (including deployable arms 148) into open state 178, such that a load or force (including bearing weight upon ground) may be applied to each of the one or more developable mechanisms 146 without said one or more developable mechanisms collapsing back into a closed stated, effectively increasing the reach and diameter of the device 100.

Figure 14:
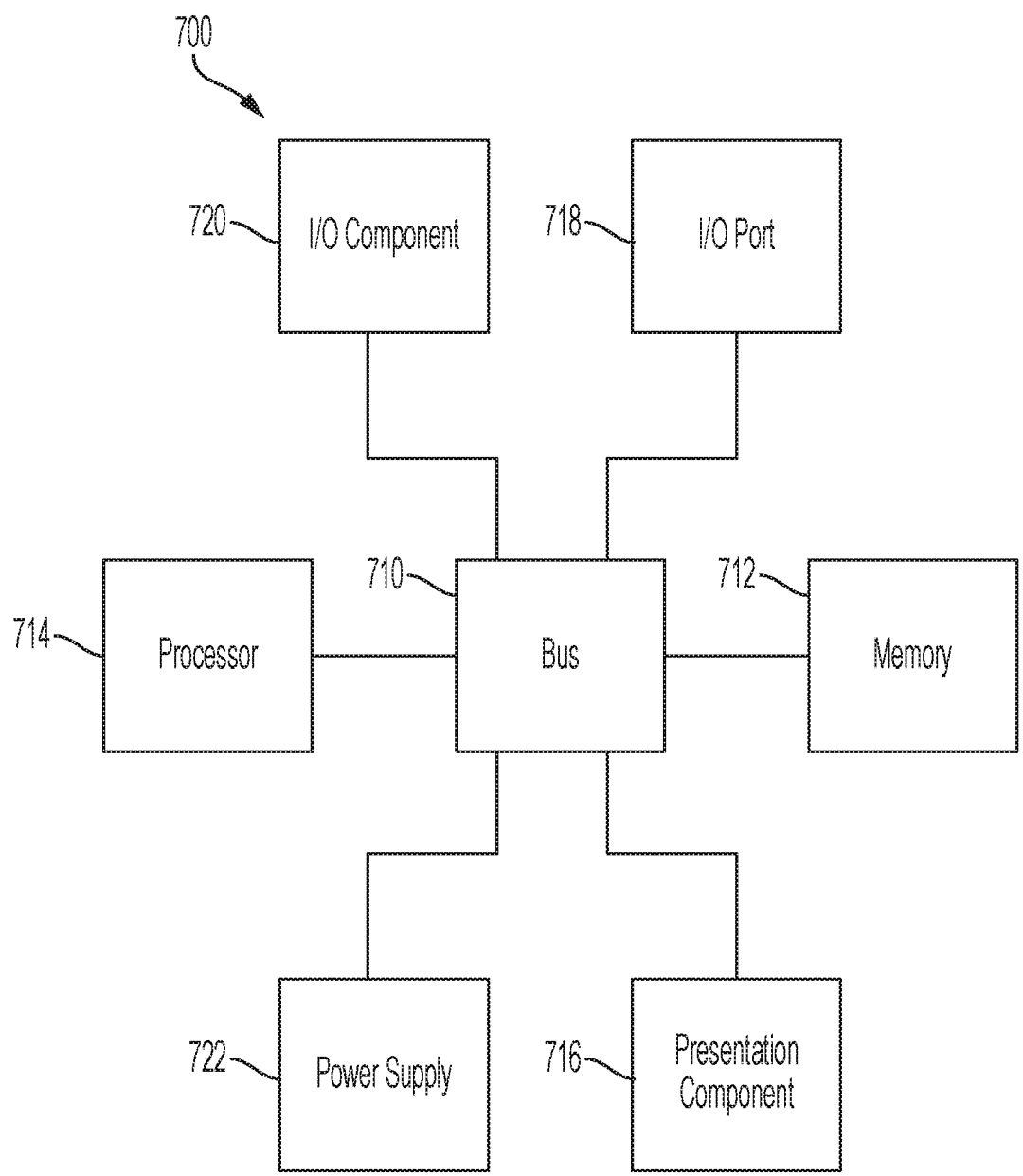
FIG. 14 is a diagrammatic illustration depicting an example computing device used to control components for applications including, but not limited to, drones and/or intelligent devices.

FIG. 14 depicts an exemplary computing device 700 that can be used to implement one or more embodiments of the present invention (and in no way limits the invention), for example by being used to control components for applications including, but not limited to, drones and/or intelligent devices. The computing device 700 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 700.

The memory 712 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 700 can include one or more processors that read data from components such as the memory 712, the various I/O components 716, etc. Presentation component(s) 716 present data indications to a user or other device. Exemplary presentation components include a display device, speaker, printing component, vibrating component, etc.

The I/O ports 718 can allow the computing device 700 to be logically coupled to other devices, such as I/O components 720. Some of the I/O components 720 can be built into the computing device 700. Examples of such I/O components 720 include a microphone, joystick, recording device, game pad, satellite dish, scanner, printer, wireless device, networking device, and the like. Each of the components and subcomponents of the computing device 700 can be incorporated into a drone core 302 of a deployable drone 300.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Further, the terms "robot" and "bot" are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Unless otherwise noted or defined herein, to the extent directional vocabulary is utilized, the disclosure and figures are described with reference to a conventional three-dimensional coordinate axis system of X, Y and Z, where the X direction is generally left-right or east-west, the Y direction is generally in-out, relative to the plane of the page of the document, and the Z direction is generally up-down or north-south on the page. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Z-axis lies in the vertical direction and the X and Y axes lie in the horizontal plane with the vertical Z axis being orthogonal thereto. To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be various combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A connected deployable arms device for increased mobility, the device
   comprising: a central hub comprising a developable surface and
   an outer cylinder comprising:
      a first end having a first annular surface;
      a second end having a second annular surface;
      a primary wall extending between the first end and the second end, defining
   an outer circumference of the outer cylinder, having a cylindrical surface and a central aperture therethrough from the first end to the second end;
   an inner cylinder comprising:
      a first end having a first annular surface;
      a second end having a second annular surface;
      a secondary wall extending between the first end and second end, defining an outer circumference of the inner cylinder, having a circumferential surface and the central aperture therethrough from the first end to the second end, the inner cylinder being concentric with, and rotatably coupled to, the outer cylinder;
   wherein the first end of the inner cylinder is adjacent to the first end of the outer cylinder, the second end of the inner cylinder is adjacent to the second end of the outer cylinder, and wherein the outer circumference and an outer radius of the inner cylinder are less than an inner circumference and an inner radius of the outer cylinder and disposed within the inner radius of the primary wall of the outer cylinder;
   one or more developable mechanisms comprising one or more deployable arms that conform to the central hub, comprising:
      one or more primary developable mechanisms comprising:
         a curved body having a contact area on a surface of the curved body; a first end pivotably connected to a first joint of the outer cylinder;
         a second end, and a second joint pivotably connecting the curved body to one or more secondary developable mechanisms;
      the one or more secondary developable mechanisms comprising:
         an adapted crank-slider having a first end pivotably connected to the second joint and a second end pivotably connected to a third joint of the inner cylinder; and
   wherein one or more developable mechanisms transition from a closed state, wherein the one or more primary developable mechanisms and the one or more secondary developable mechanisms are contained entirely within the outer cylinder outer circumference, to an open state wherein the inner cylinder rotates relative to the outer cylinder, forcing the one or more primary developable mechanisms and one or more secondary developable mechanisms to extend outside the outer cylinder outer circumference.

2. The connected deployable arms device of claim 1, wherein at the first closed state wherein the primary developable mechanisms and secondary developable mechanisms are contained entirely within the outer cylinder outer circumference.

3. The connected deployable arms device of claim 2, wherein the adapted crank-slider of each of the one or more secondary developable mechanisms comprises a distal tab at first end pivotably connected to the second joint, projecting away from a center aperture and opposite a concave side of a curvilinear body of the adapted crank-slider.

4. The connected deployable arms device of claim 1, wherein the one or more developable mechanisms are arranged and shaped to conform to and/or emerge from the cylindrical surface, which in turn conforms to encapsulating shapes including one or more of cylinders, truncated cones, and tangent developed surfaces.

5. The connected deployable arms device of claim 4, wherein the one or more developable mechanisms comprising the one or more primary developable mechanisms and the one or more secondary developable mechanisms in the closed state are contained within a recessed channel of the cylindrical surface of the outer cylinder, the recessed channel disposed between the first end of the outer cylinder and the second end of the outer cylinder, and extending along a circumference thereof.

6. The connected deployable arms device of claim 5, wherein the device completely recesses within the recessed channel all of the one or more developable mechanisms and deployable and/or extendable components when in the closed state, such that all of the one or more developable mechanisms and deployable and/or extendable components comprising the one or more primary developable mechanisms, the one or more secondary developable mechanisms and/or any other joints or links are constrained within a radius of curvature of the outer cylinder and each are further configured in shapes fitting inside the cylinders when fully collapsed in the closed state.

7. The connected deployable arms device of claim 1, wherein the inner cylinder and the outer cylinder are geometrically similar and concentric but not congruent, and an outer curve of the curved body of each of the one or more primary developable mechanisms is geometrically similar to a curvilinear body of the adapted crank-slider of each of the one or more secondary developable mechanisms and each are geometrically similar to, and match, a curvature of the outer cylinder so as to be flush with the outer cylinder outer circumference in the closed state.

8. The connected deployable arms device of claim 1, wherein the one or more primary developable mechanisms and the one or more secondary developable mechanisms comprise a plurality of components connected and disposed at equal circumferential distances around and corresponding to the outer cylinder outer circumference.

9. The connected deployable arms device of claim 1, wherein the transition from the closed state to the open state is actuated in each of the one or more developable mechanisms independently such that each deployable arm comprises an independent mechanism.

10. The connected deployable arms device of claim 1, wherein each of the one or more developable mechanisms is interconnected with another of the one or more developable mechanisms, limiting a number of actuators needed to transition from the closed state to the open state.

11. The connected deployable arms device of claim 1, wherein the inner cylinder is rotated by electric action or electromotive force.

12. The connected deployable arms device of claim 1, wherein the transition from the closed state to the open state is actuated by an electric motor or transducer connected to and driving rotation of the inner cylinder.

13. The connected deployable arms device of claim 1, wherein the transition from the closed state to the open state is actuated by inertial force or centrifugal force in reaction to centripetal acceleration.

14. The connected deployable arms device of claim 1, wherein each of the one or more developable mechanisms are configured to create mechanical advantage to achieve motion so as to be actuated with inertial forces or centrifugal forces in reaction to centripetal acceleration and to lock into place once deployed.

15. The connected deployable arms device of claim 1, wherein the one or more primary developable mechanisms are disposed in a first plane projecting from and perpendicular to the central aperture and the one or more secondary developable mechanisms, are disposed in a second plane projecting from and perpendicular to the central aperture, that is offset from the first plane, allowing each of the one or more primary developable mechanisms and the one or more secondary developable mechanisms to be configured with increased length around the outer cylinder without interfering with any other of the one or more developable mechanisms.

16. The device of claim 1, wherein the first joint, the second joint and the third joint of each of the one or more developable mechanisms comprises connecting components including one or more of hinges, bearings, or bushings, pins, pegs, slots, balls-and-sockets, rotatable couplings, axles, rivets, and compliant components.

17. The device of claim 16, wherein one or more of the first joint, the second joint and the third joint of the one or more developable mechanisms comprises compliant components having the ability to create bistable or multistable behavior in the device.

18. The connected deployable arms device of claim 16, wherein at least one of the first joint and the third joint is a compliant mechanism.

19. The connected deployable arms device of claim 1, wherein parameters altering the appearance and function of each of the one or more developable mechanisms include one or more of: a length of the one or more primary developable mechanisms or second links; a length of the one or more secondary developable mechanisms or third links; relative placement of second joints where the one or more primary developable mechanisms or second links and the one or more secondary developable mechanisms or third links connect a ratio of length of the one or more primary developable mechanisms or second links to the one or more secondary developable mechanisms or third links; and geometric distance between each joint.

20. The connected deployable arms device of claim 1, wherein a contact area of at least one of the one or more primary developable mechanisms is a stabilizing platform or foot.

21. The connected deployable arms device of claim 1, wherein the one or more developable mechanisms comprising deployable arms are four-bar mechanisms or four-link mechanisms comprising:
   a first link comprising an outer cylinder comprising;
      a first end having a first annular surface bounded by a first edge having an inside radius edge and a second edge having an outside radius;
      a second end having a second annular surface bounded by a first edge having the inside radius and a second edge having the outside radius;
   a second link comprising one or more primary developable mechanisms in a first plane perpendicular to the central aperture;
   a third link comprising one or more secondary developable mechanisms in a second plane perpendicular to the central aperture;
   a fourth link comprising an inner cylinder comprising:
      a first end having a first annular surface bounded by a first edge having an inside radius edge and a second edge having an outside radius; and
      a second end having a second annular surface bounded by a first edge having the inside radius and a second edge having the outside radius.

22. The device of claim 1, further comprising: an outer cylinder or first link material, a primary developable device or second link material, a secondary developable device or third link material, an inner cylinder or fourth link material, and a joint material, each comprising one or more of a metal, a plastic, a composite material, an organic material, a ceramic material, a compliant material, and combinations thereof.

23. The device of claim 1, wherein compliant elements or material cause one or more deployable arms to be biased to preferred open and/or closed positions, reducing actuation effort from an unbiased configuration of one or more deployable arms.

24. The connected deployable arms device of claim 1, wherein at least most of the one or more primary developable mechanisms are positioned between cylindrical planes aligned with the outer circumference of the outer cylinder and an opposing inner circumference of the outer cylinder when the one or more primary developable mechanisms are in the closed state.

25. The connected deployable arms device of claim 1, wherein at least most of the one or more secondary developable mechanisms are positioned between cylindrical planes aligned with the outer circumference of the inner cylinder and an opposing inner circumference of the inner cylinder when the one or more secondary developable mechanisms are in the closed state.

26. The connected deployable arms device of claim 1, wherein the circumferential surface of the secondary wall forms a continuous, cylindrical surface.

* * * * *